United States Patent [19]
Ryu et al.

[11] Patent Number: 5,594,836
[45] Date of Patent: Jan. 14, 1997

[54] ENNOVERSION MANAGEMENT SYSTEM FOR DATA PROCESSING SYSTEM

[75] Inventors: Tadamitsu Ryu; Hiroyuki Izumi; Masahiko Murakawa; Masanobu Toyota; Takeshi Adachi, all of Kawasaki; Naomi Ichikawa, Yokohama, all of Japan

[73] Assignee: Fujitsu Limited, Kawasaki, Japan

[21] Appl. No.: 247,665

[22] Filed: May 23, 1994

[30] Foreign Application Priority Data

May 25, 1993 [JP] Japan ..................... 5-122559

[51] Int. Cl.⁶ ..................... G06F 17/00; G06F 7/00
[52] U.S. Cl. ..................... 395/62; 395/8; 395/619
[58] Field of Search ..................... 395/62, 75, 68, 395/64, 600

[56] References Cited

U.S. PATENT DOCUMENTS

| | | | |
|---|---|---|---|
| 4,558,413 | 12/1985 | Schmidt et al. | 364/300 |
| 4,853,843 | 8/1989 | Ecklund | 364/200 |
| 5,287,496 | 2/1994 | Chen et al. | 395/600 |
| 5,558,413 | 12/1995 | Schmidt et al. | 364/300 |

OTHER PUBLICATIONS

Ambriola, V. et al, "Object–Oriented Configuration Control", ACM SIGSOFT, V. 14, N. 7, 1989, pp. 133–6.
Watson, A. S., et al, "A prolog–based object oriented engineering dbms", Computers & Structures, V. 40, N. 1, 1991, pp. 11–21.
Belkhatir, N. et al, "Major issues on PSEE," Computers and AI, v. 12 (3), pp. 279–298, 1993 (May).

Primary Examiner—Robert W. Downs
Assistant Examiner—A. Katbab
Attorney, Agent, or Firm—Staas & Halsey

[57] ABSTRACT

An ennoversion management system is adapted to a data processing system executes a desired process by naming as objects single processing units and/or composite processing units which are combinations of the single processing units and combining the objects. In the ennoversion management system, a real world is understood as an object model, the real world is made to correspond to an extension and a connotation, the connotation is placed in an information concealed region, and ID information which specifies the connotation in correspondence with the extension is formed. The real world is described by a dynamic world and a static world forming a world of the objects in correspondence with the extension, a system mechanism is given as a static model with respect to the static world using classes and/or composite classes, and a session corresponding to a motion of the dynamic model is given as a dynamic model with respect to the dynamic world using instances of the composite classes and/or the classes. Cause and effect relationship generated from the dynamic model is given into the static model as information. The classes and/or composite classes are formed by combing a plurality of existing and/or newly generated methods, and the instances are formed in correspondence with the classes and/or the composite classes. The existing and/or newly generated methods, the formed classes and/or composite classes, and the session corresponding to the motion of the dynamic model are stored as composite objects in the information concealed region corresponding to the connotation as a functional model. In correspondence with the identification information, the objects and/or composite objects stored in the connotation as a functional model are reusably formed. An ennoversion management with respect to the classes, the composite classes, the instances and the sessions is carried out.

5 Claims, 19 Drawing Sheets

5,594,836

ENNOVERSION MANAGEMENT SYSTEM FOR DATA PROCESSING SYSTEM

BACKGROUND OF THE INVENTION

The present invention generally relates to ennoversion management systems, and more particularly to an ennoversion management system for a data processing system which regards the real world as an object model, makes the real world correspond to an extension and a connotation, places the connotation in an information concealed region, makes identification information which specifies the connotation correspond to the extension, and describes the real world by a static world and a dynamic world which form an object world in correspondence with the extension. A system mechanism is given to the static world by classes and/or composite classes. The movement in a dynamic model is given to the dynamic world by instances of the classes and/or composite classes. An object identification is added with respect to the individual objects forming each composite object. The composite objects used in the data processing system can be specified by the groups of the object identifications which are added to the individual objects.

First, a description will be given of a conceivable method of forming a capsule of objects, by referring to FIGS. 1A through 1C.

For example, execution process data 214 are made up of a series of instructions (or instruction groups) 250 shown in FIG. 1A which are serialized in the processing sequence. A number of such instructions (or instruction groups) 250 form a processing unit 251 which executes a predetermined process, that is, makes a certain behavior.

Accordingly, the execution process data 214 shown in FIG. 1A may be regarded as a collection of the processing units 251 which are serialized in the processing sequence as shown in FIG. 1B, where each processing unit 251 makes a certain behavior. The serialized execution process data 214 shown in FIG. 1B as a whole carry out a specific operation. Hence, the execution process data 214 for carrying out another specific operation is a connection of the processing units 251 having a different combination.

As the number of existing processing units 251 which make different behaviors becomes large, the individual processing units 251 are integrated under a predetermined method M as shown in FIG. 1C, so as to obtain an integrated processing unit group which carries out the same operation as the execution process data 214 shown in FIG. 1B.

Next, a description will be given of particular examples of the relationships of the object, the object command and the object part.

FIG. 2 shows a real world, that is, an example of a model for departments of a company. Within a box representing "employees" in FIG. 2, there is a "secretary" belonging to a "work type=1", a "leader" belonging to a "work type=2", and a "worker" belonging to a "work type=3". A box representing "employees" belongs to a box representing a "team".

The "leader" is related to the "team" under the relationship "team leader". In addition, the "worker" is related to a "machine" under the relationship "worker/machine" within the box representing "work unit".

The "team" and the "machine" are related under the relationship "machine/workshop". The "worker" and the "machine" are related under the relationship "machine/worker". In addition, the "employee" and the "department/employee" are related under the relationship "department".

Furthermore, the "employee" and the "position" are related under the relationship "employee/attribute". The "work unit" and the "part" are related under the relationship "work unit/part".

The following relationships also exist.

(1) The "department" is related to the object "department name" and the object "dollars".

(2) The "team" is related to the object "name" by a team identification number, related to the object "employee number" by the work type, related to the object "code name" and the object "surname" by the name, related to the object "dollars" by the salary, related to the object "dollars" by the average salary, and related to the object "number" by the average number of departments.

(3) The "secretary" is related to the object "number" by the typing speed.

(4) The "position" is related to the object "name" by the name, and related to the object "year" by the age.

(5) The "part" is related to the object "part number" and the object "dollars".

(6) The "work unit/part" is related to the object "number" by the volume.

(7) The "work unit" is related to the object "time" by the required time.

(8) The "machine" is related to the object "machine number", the object "dollars" and the object "machine name".

(9) The "machine/work" is related to the object "time" by the time used.

The model shown in FIG. 2 can generally be represented as shown in FIG. 3 if the "behavior" (or method) is indicated by a circular box, the "data" is indicated by a rectangular box, and the "relationship" is indicated by a rhombic box. In other words, (1) a method "a" and a data "I" are combined and function as one larger data "IV", (2) methods "b" and "c" are related to a data "II" by a relationship "α" and function as one larger data "V", (3) methods "c" and "d" are related to a data "III" by a relationship "β" and function as one larger data "VI", and (4) a method "e" are related to data "IV" and "V" by a relationship "τ" and function as still a larger data "VII". In other words, the behaviors (or methods) are gathered and represented as a larger group.

Each circular box, rectangular box and rhombic box shown in FIG. 3 can be treated as an individual object.

The forming of a capsule shown in FIG. 4A will now be considered for a collection of the method "a" and the data "I" shown in FIG. 3. In FIG. 4A, an opening is formed at the top of the capsule to indicate that a message communication can be made. If this opening of the capsule were closed as shown on the left side of FIG. 4B, such a capsule would then correspond to the data "IV" which is a collection of the method "a" and the data "I" in FIG. 3. If a composite object is obtained by adding a method "M" to the data "D" (capsule) shown on the left side of FIG. 4B, the data shown at the central part of FIG. 4B is obtained. Further, if a composite object is obtained by further adding a method to the data shown at the central part of FIG. 4B, the data shown on the right side of FIG. 4B is obtained. Hence, FIG. 4B shows the formation of composite objects by successively adding methods.

The formation of the composite objects is not limited to that shown in FIG. 4B. For example, the composite objects may be formed as shown in FIG. 4C. In FIG. 4C, the data "D" of the object shown on the leftmost side is replaced by an object which is made up of a method and a data, as shown on the second leftmost side. In this case, a message passing is required between a method "M1" and a data "D1", and the method "M1" becomes one object as shown on the second rightmost side in FIG. 4C. As a result, objects "A" and "B" exist within an object "C", and the message passing exists between the objects "A" and "B".

Furthermore, if the method "M" of the object "B" is replaced by an object "B1" and the data "D" of the object "B" is replaced by an object "B2", both the object "B1" and "B2" exist within the object "B" and the message passing exists between the objects "B1" and "B2" as shown on the rightmost side in FIG. 4C.

Therefore, the composite objects are formed by successively combining the objects. For example, the so-called primitive objects which will be described later are combined to form a capsule object, the capsule objects are combined to form an event object, and the event objects are combined to form a system object.

The data "D" described above is generally made up of a plurality of processing units which are the subject of the processing. On the other hand, the method "M" may be considered as information or information group instructing how the plurality of processing units are to be utilized. The object which is represented in FIG. 4 is a "processing unit" which is treated as an individual "processing unit" or a collection of "individual processing units".

As shown in FIG. 3, the individual objects "I", "II" and "III" form a part of the larger objects "IV", "V" and "VI". In addition, the objects "IV", "V" and "VI" form a part of still a larger object "VII". In other words, the objects "IV", "V" and "VI" are in an "is-a" relationship or a "part-of" relationship with the object "VII" when viewed from the object "VII".

If the objects "I", "II" and "III" are regarded as minimum units, these objects "I", "II" and "III" may be said to be primitive objects. The capsule object is formed by a collection of such primitive objects. The event object is formed by a collection of such capsule objects. Furthermore, a still larger system object is formed by a collection of such event objects.

The objects described above which are made up of a collection of smaller objects are respectively referred to as a composite object. The primitive object is included in the concept of the composite object. However, the primitive object is an object of the minimum unit as described above. For this reason, when a reference is generally made to a "composite object" or an "object", it is better to exclude the primitive object which exists by itself and cannot be decomposed further.

The object in the capsule form is generally made up of the composite objects described above in the capsule form.

As shown in FIG. 2, the objects corresponding to "processing units" are mutually complicated and related in the real world. The "processing unit" may be the individual processing unit or a collection of individual processing units.

As described above, the real world in general can be described by a model using the objects. Hence, it is desirable to recall the classes and the composite classes held in the information concealed world and to use them for the system design. In addition, when making the system design, it is desirable to use four hierarchical layers made up of the classes, composite classes, instances and composite instances (sessions).

However, according to the generally known program version management, there is no concept of carrying out the version management by making the classes, the composite classes, the instances and the composite instances (sessions) correspond to each other.

On the other hand, according to the conventional version management, the version management is made to manage the state of the program modification. In other words, when an error or some inconvenience exists in the original program and a modification is made, the version management is made to manage the state of this modification.

However, in the data processing system, it is desirable to introduce the concept of obtaining more superior composite classes and composite instances by exceeding the range of the conventional version management when it becomes necessary to partially modify particularly the composite classes and the composite instances so as to match the desired process which is requested by the user.

SUMMARY OF THE INVENTION

Accordingly, it is a general object of the present invention to provide a novel and useful ennoversion management system which eliminates the problems described above.

More particularly, the object of the present invention is to realize an ennoversion management system which carries out the ennoversion management in correspondence with the objects so that the system may be used for generating more superior objects in the future. The ennoversion management includes management of the version and the evolution or innovation.

Another and more specific object of the present invention is to provide an ennoversion management system adapted to a data processing system which executes a desired process by naming as objects single processing units and/or composite processing units which are combinations of the single processing units and combining the objects, comprising means for understanding a real world as an object model, for corresponding the real world to an extension and a connotation, for placing the connotation in an information concealed region, and for forming identification information which specifies the connotation in correspondence with the extension; means for describing the real world by a dynamic world and a static world forming a world of the objects in correspondence with the extension; means for giving as a static model a system mechanism with respect to the static world using classes and/or composite classes, and for giving as a dynamic model a session corresponding to a motion of the dynamic model with respect to the dynamic world using instances of the composite classes and/or the classes; means for giving cause and effect relationship generated from the dynamic model into the static model as information; means for forming the classes and/or composite classes by combining a plurality of existing and/or newly generated methods, and for forming the instances in correspondence with the classes and/or the composite classes; means for storing as a functional model the existing and/or newly generated methods, the formed classes and/or composite classes, and the session corresponding to the motion of the dynamic model in the information concealed region corresponding to the connotation as composite objects; means for reusably forming in correspondence with the identification information the objects and/or composite objects stored in the connotation as a functional model; and means for carrying out an ennoversion management with respect to the classes, the composite classes, the instances and the sessions, where the ennoversion management includes management of version and evolution or innovation. According to the ennoversion management system of the present invention, the existing objects and the newly generated objects which are respectively held in the information concealed world can be recalled by the object command based on the user's request when designing the static model and the dynamic model, so as to cope with the user's request. In addition, the process of coping with the user's request is extremely flexible, and the used information can be stored for possible future use, so that the gained information (knowledge) is not lost or wasted. Furthermore, it is possible to carry out the ennoversion management in order to obtain a more preferable object which is suited for reuse for each of the objects.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 5.

The present invention carries out (i) a version management, and (ii) an evolution or innovation management. The version management manages modification factors, including errors, existing in the original objects. The original objects may be the classes, composite classes, instances and composite instances. On the other hand, the evolution or innovation management manages the increase and decrease of the contents when the original objects include no error. In the present invention, a term "ennoversion" is used to include both the version and the evolution or innovation. Hence, a term "ennoversion management" includes both the version management and the evolution or innovation management.

Figure 5:
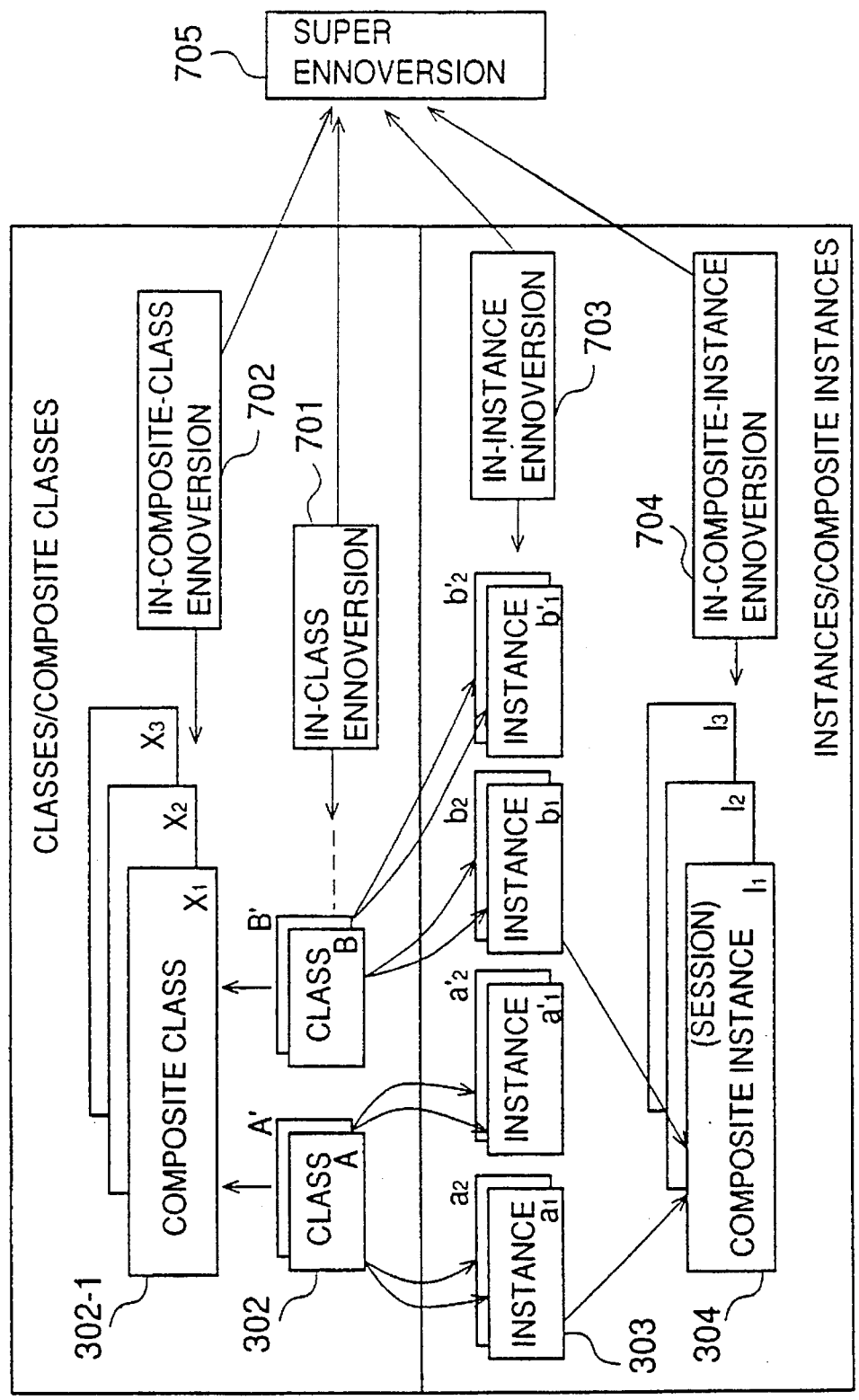
FIG. 5 is a diagram for explaining the operating principle of the present invention.

FIG. 5 shows classes 302, composite classes 302-1, instances 303, sessions (or composite instances) 304, an in-class ennoversion management part 701, an in-composite-class ennoversion management part 702, an in-instance ennoversion management part 703, an in-composite-instance ennoversion management part 704, and a super ennoversion management part 705.

Although only four ennoversion management parts 701 through 704 are shown in FIG. 5, it is possible to additionally provide an in-function ennoversion management part (not shown). Alternatively, this in-function ennoversion management part may be regarded as being included in the four ennoversion management parts 701 through 704.

In the present invention, classes A and B, and sometimes also composite classes $X_1$ and $X_2$, are stored in the information concealed world, as will be described later. The classes A and B, and sometimes also the composite classes $X_1$ and $X_2$ are read into the static world in order to build a system for executing the desired process which is requested by the user. Instances $a_1, b_1, \ldots$ are generated in correspondence with each of such classes A, B, $X_1$ and $X_2$. In general, the generated instances $a_1, b_1, \ldots$ are assembled in the session 304 so as to execute a process corresponding to the above system. The desired process which is requested by the user is executed by executing the session 304.

A plurality of classes such as the classes A and B are combined to form the composite classes $X_1$, $X_2$ and the like. These composite classes $X_1$, $X_2$ and the like may be reused later.

In the present invention, the four ennoversion management parts 701 through 704 are provided in correspondence with the four hierarchical layers of the classes 302, the composite classes 302-1, the instances 303 and the sessions (composite instances) 304.

In other words, if the class A is modified into a class A', for example, the in-class ennoversion management part 701 carries out a process of holding information corresponding to this modification.

For example, a plurality of instances $a_1, a_2, \ldots$ may be generated in general in correspondence with the class A', for example. When the instances $a_1$ and $a_2$ are modified into instances $a_1'$ and $a_2'$, the in-instance ennoversion management part 703 carries out a process of holding information corresponding to these modifications.

Similarly, the composite class $X_1$ may be modified and composite classes $X_2$ and $X_3$ may be obtained or, a composite instance $I_1$ may be modified and composite instances $I_2$ and $I_3$ may be obtained. In the former case, the in-composite-class ennoversion management part 702 operates. On the other hand, the in-composite-instance ennoversion management part 704 operates in the latter case.

Furthermore, when there is a need to made modifications related to at least two out of the classes 302, the composite classes 302-1, the instances 303 and the composite instances 304, the super ennoversion management part 705 operates to process the mutual relationships.

Figure 6:
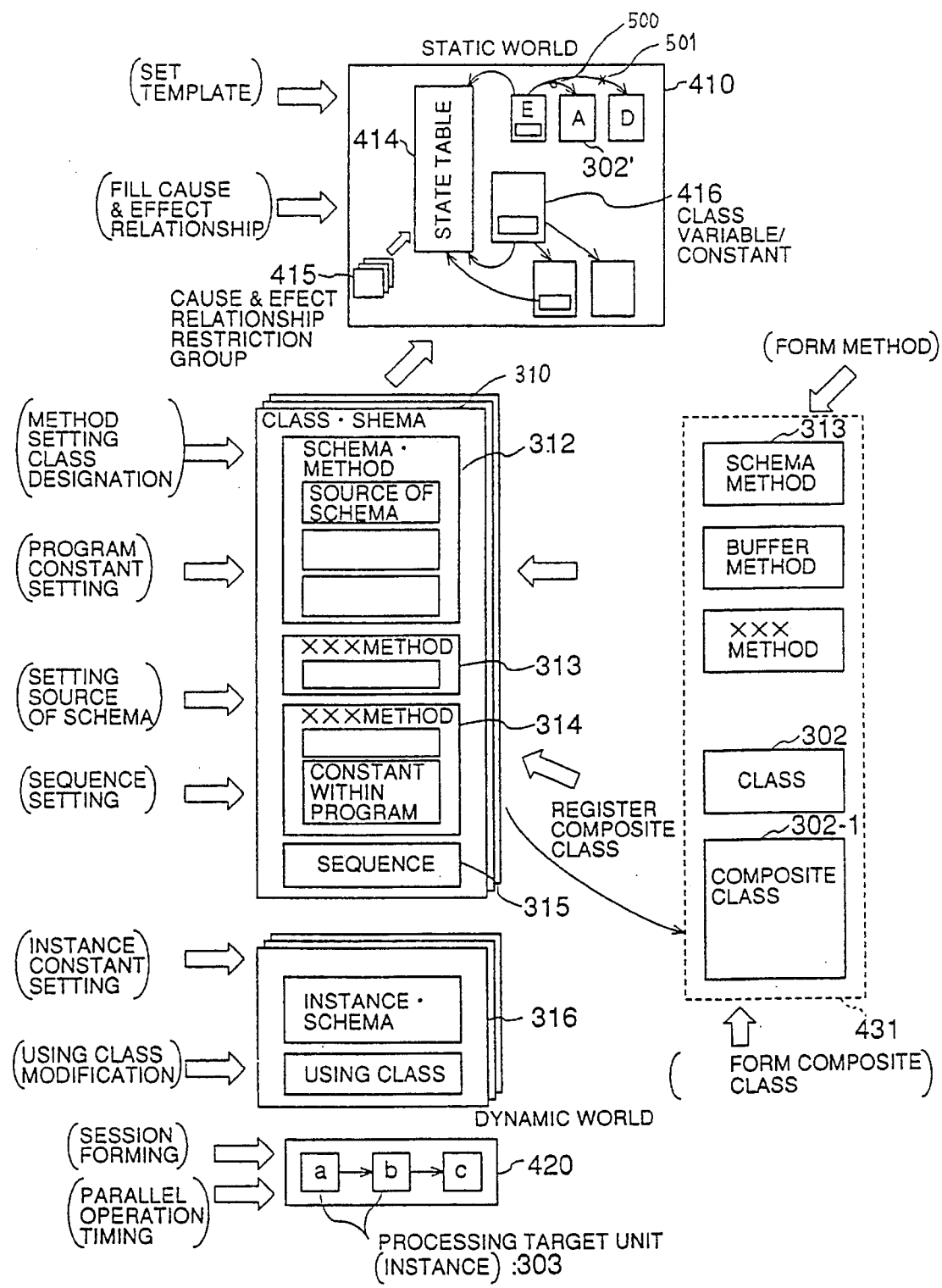
FIG. 6 is a diagram schematically showing the construction of an embodiment of an ennoversion management system according to the present invention applied to a data processing system.

FIG. 6 schematically shows the construction of an embodiment of an ennoversion management system according to the present invention applied to a data processing system. An internal schema 310 generates classes and composite classes in correspondence with a process request which is given a new target, and generates instances in correspondence with the generated classes and composite classes. For the sake of convenience, a reference may only be made to the class and not to the composite class in order to simplify the description in the following.

FIG. 6 also shows a static world 410, a dynamic world 420 and a functional model 431. The real world is regarded as an object model, and the real world is made to correspond to an extension and a connotation. The data processing system includes the connotation which stores existing methods 313 and classes 302 in the information concealed world as the functional model 431. In addition, the data processing system includes the extension as the static world 410 and the dynamic world 420.

In the static world 410, a plurality of methods 313 and classes 302 are gathered as a class corresponding to the new process request, and such classes are combined to form a system mechanism for executing the new process request. In the dynamic world 420, instances corresponding to each of the classes are chained in the processing sequence with which the new process request is executed so that sessions may be formed, and the dynamic model for executing the system is given.

A class schema 312 shown in FIG. 6 is a functional part for generating the classes. Methods 313 through 315 are input by the class schema 312 as constituent elements of the classes corresponding to the new process request.

An instance schema 316 indicates a functional part for generating the instances which are made to correspond to the respective classes corresponding to the new process request.

FIG. 6 also shows instances 303, a state table 414, a cause and effect relationship restriction group 415, and a class variables and constants 416. In the state table 414, the hierarchical relationship of the plurality of classes which are input as the constituent elements are described and the class variables and constants to be used are linked in the system which is assembled to correspond to the new process request. The cause and effect relationship restriction group 415 is also written in the state table 414, and the cause and effect relationship which becomes a restriction when executing the sessions in the dynamic world 420 are described. The cause and effect relationship which indicates that an instance a must already be executed in order to execute an instance b, for example, is described, and this cause and effect relationship is checked when executing the sessions.

A strong link 500 and a weak link 501 are also shown in FIG. 6. The strong link 500 indicates that information must be inherited in correspondence with the occurrence of a phenomenon. On the other hand, the weak link 501 indicates that information is inherited in correspondence with the occurrence of the phenomenon if necessary.

When there is an instruction to assemble a system corresponding to the new process request, the classes which become the constituent elements of the system are generated. When generating the classes, the methods necessary for forming the classes, the names of the classes, and the points for pointing the methods and classes are given to the class schema 312. Then, the necessary methods and classes are input from the functional model 431 to the internal schema 310. The instance schema 316 generates the instances which are necessary in order to execute the classes, in correspondence with the generation of the classes. Each of the generated instances are made to correspond to the classes which use the instances.

The classes which are generated as described above, are linked in the state table 414 within the static world 410, and become the constituent elements of the system which is assembled to correspond to the new process request. A class 302' shown in FIG. 6 indicates such a class which became the constituent element. On the other hand, in the dynamic world 420, the instances 303 are time-sequentially linked and the sessions are assembled, so as to execute the system. The system is executed by executing the sessions. Or, the system is prepared to an executable state by assembling the sessions.

The classes and composite classes corresponding to the new process request are generated in the above described manner. These classes and composite classes are held as the functional model 431, and is thereafter used for assembling a system in correspondence with another new process request. When the system is assembled, it is possible to use the strong link 500 and the weak link 501 to assemble the system depending on the needs, depending on the situation or, depending on the mood, so that the information may be inherited skillfully.

Figure 7:
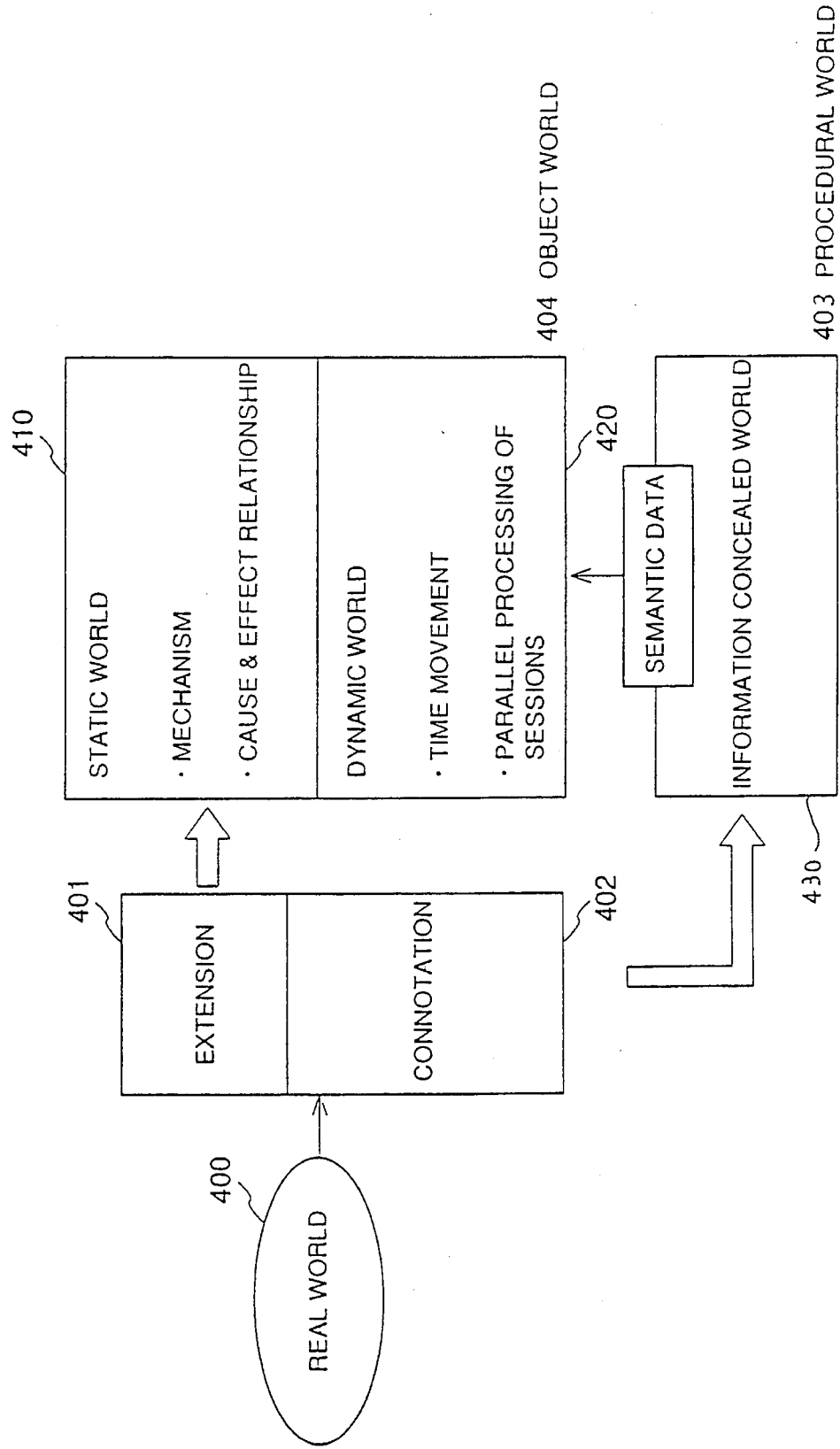
FIG. 7 is a diagram for explaining a static world and a dynamic world.
Figure 8:
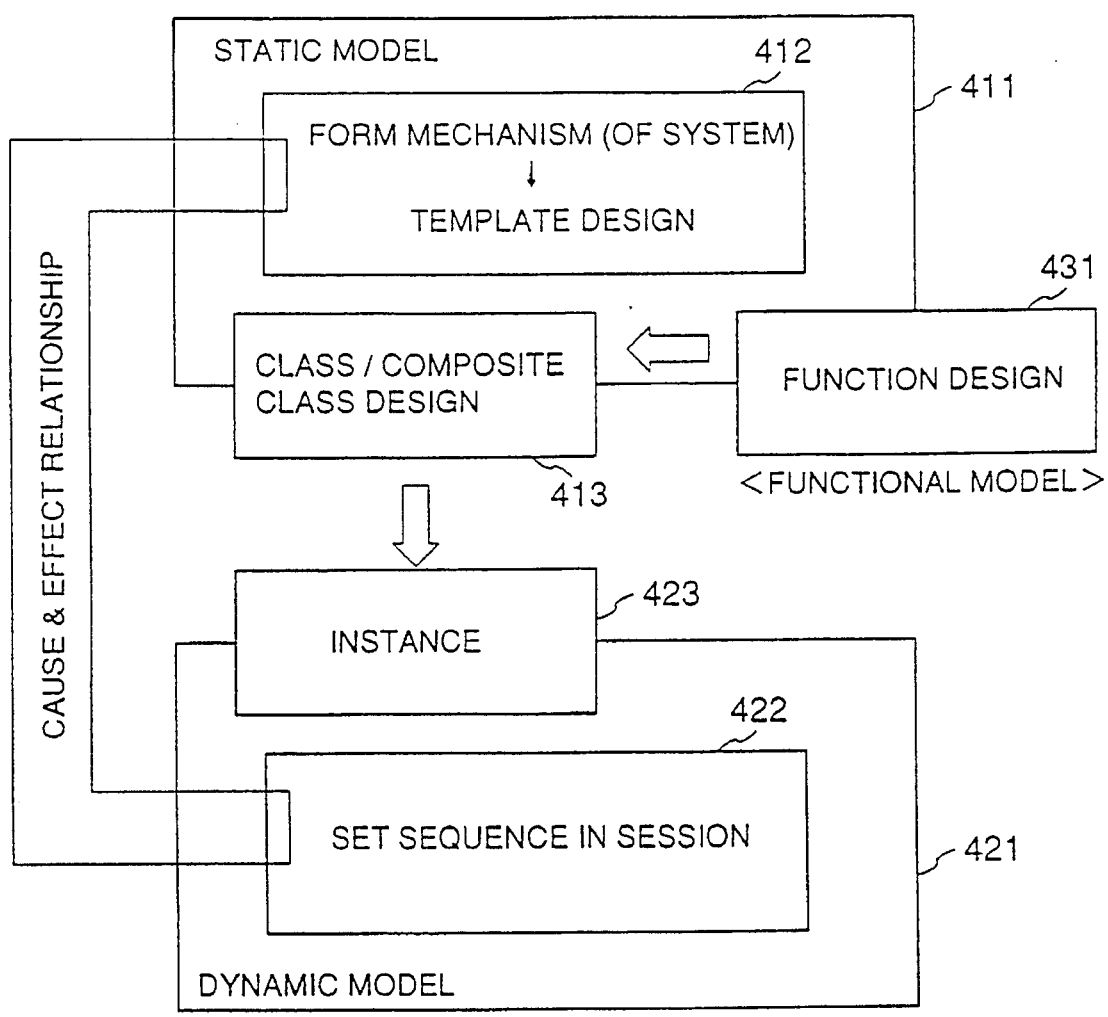
FIG. 8 is a diagram for explaining the relationships of a static model, a dynamic model and a functional model.

FIGS. 7 and 8 are diagrams for explaining the static world and the dynamic world.

The real world (for example, a request of a user) 400 can be described by a model by making a connotation 402 correspond to an extension 401, where the connotation 402 gives particular information representing the real world 400, and the extension 401 simply represents the real world 400. When exchanging information, such as exchanging information related to the certain real world 400, it is sufficient to give the extension 401 for this real world 400 if there is mutual understanding of the connotation 402 related to this real world 400. In other words, there is not need to notify the other party of the particular information each time, and it is sufficient to merely notify the name of this real world 400.

FIG. 7 is a diagram for explaining the static world and the dynamic world.

For the reasons described above, the information is generally concealed in the connotation 402, and connotation 402 corresponds to the information concealed world 430 or the procedural world 403. On the other hand, the model of the real world 400 can be formed by the static world 410 which gives the mechanism (or construction) of the real world 400 and the cause and effect relationship within this mechanism, and the dynamic world 420 which describes time movements in the real world 400 and indicates whether or not to permit parallel processing of a plurality of sessions. The correspondence between the procedural world (information concealed world) 403 and the static world 410 and the dynamic world 420 is made by the extension 401 as shown in FIG. 7.

Furthermore, the connotation 402 is the information concealed world, and includes data which give meaning (or significance) to the extension 401. The real world 400 is simulated by the extension 401 which includes this meaning (or significance). This simulation of the real world 400 gives a static model corresponding to the static world and a dynamic model corresponding to the dynamic world.

FIG. 8 is a diagram for explaining the relationships of the static model, the dynamic model and the functional model.

A static model 411 shown in FIG. 8 is a model corresponding to the static world 410 shown in FIG. 7, and a dynamic model 421 shown in FIG. 8 is a model corresponding to the dynamic world 420 shown in FIG. 7. In addition, a functional model 431 shown in FIG. 8 corresponds to the information concealed world shown in FIG. 7.

By specifying the mechanism of the system and designing the "is-a" and "part-of" relationships (templates) described above, it is possible to form the static model 411. Then, the functional design is obtained, and the class 302 or a composite class 302-1 shown in FIG. 6 is designed in a corresponding manner. A plurality of classes are added or integrated to form the composite class 302-1.

The dynamic model 421 is formed by assigning instance data within the class 302 to form a specific target processing unit (instance), and designing the time sequential relationship of each of the target processing units. The restrictions of the cause and effect relationship are given between the static model 411 and the dynamic model 421.

The existing methods 313, the classes 302 and the newly generated classes are held as the functional model 431, and are used thereafter when assembling the system in correspondence with another new process request. These methods and classes are dynamically assembled as the system and used, and a dynamic object process will now be described.

Figure 9:
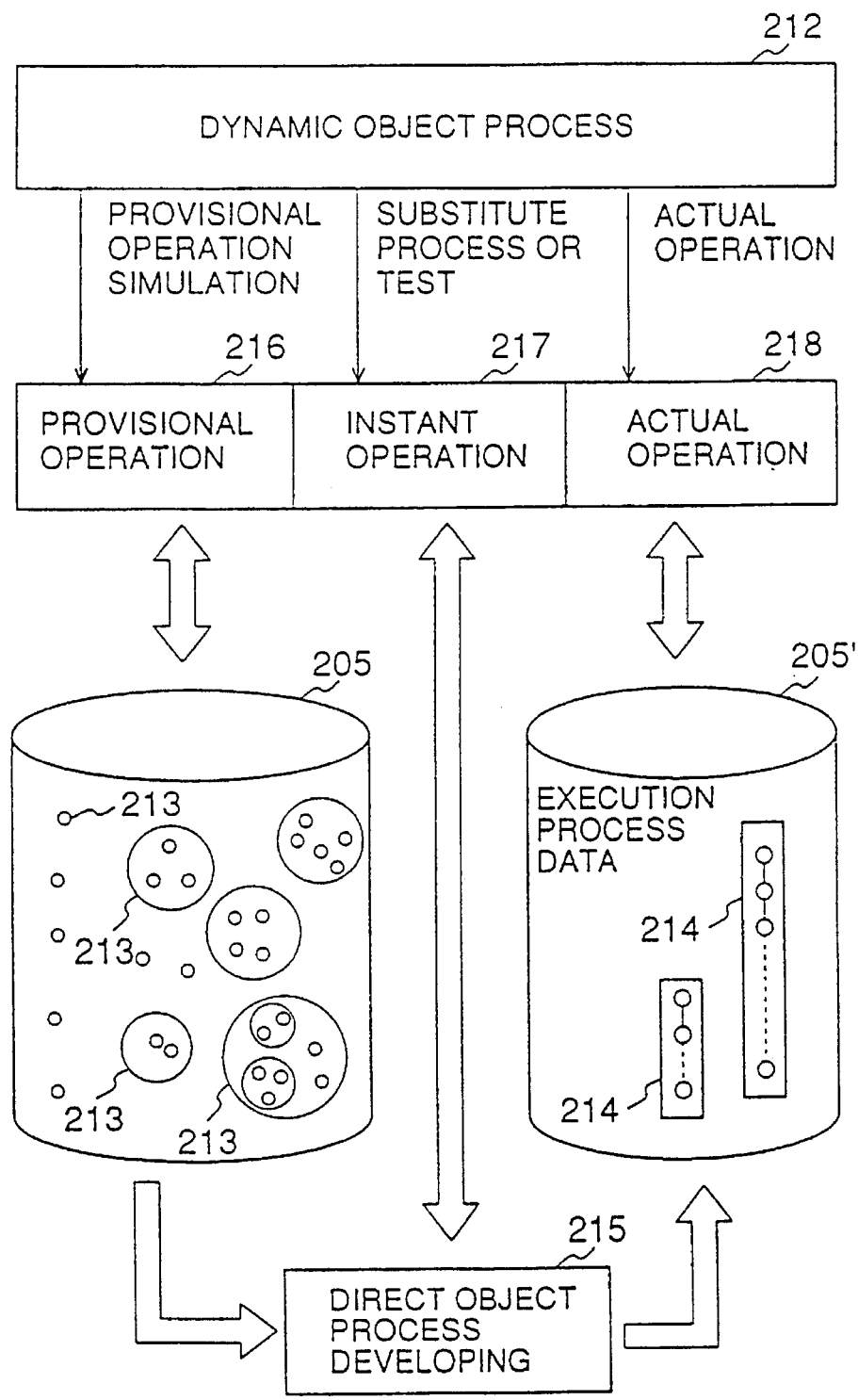
FIG. 9 is a diagram for explaining a portion of the operation of a dynamic object processor.

FIG. 9 is a diagram for explaining a portion of the operation of a dynamic object processor.

The methods and classes described above are held in a parts attribute file 205 as object parts 206 shown in FIG. 11 which will be described later. A dynamic object process part 212 shown in FIG. 9 carries out a process using the object parts 206. Of course, it is possible to appropriately combine the object parts 206 or composite object parts which are combinations of the object parts 206.

The dynamic object process part 212 shown in FIG. 9 has a provisional operation mode 216 for carrying a simulation or the like, an instant operation mode 217 for carrying out a test or the like, and an actual operation mode 218 for carrying out a data processing or a communication process with another terminal.

A file 205' holds execution process data 214 which is obtained by compiling all or a portion of the content of the parts attribute file 205 so as to enable high-speed execution. In the case of an object program for process execution, the execution process data 214 in general are processing units which are made up of several tens to several hundred steps and serially connected in the processing sequence.

The objects 213 are shown within the parts attribute file 205. Generally, the object 213 may correspond to the form of the primitive object as it is, the state of the capsule object, the state of the event object or the state of the system object. The objects 213 are stored in the form of object parts 206 so that it can be specified by the object commands.

A direct object process developing process 215 carries out a process of obtaining the execution process data 214 by developing the individual objects 213 or, developing a plurality of objects 213 as a whole.

Figure 1A:
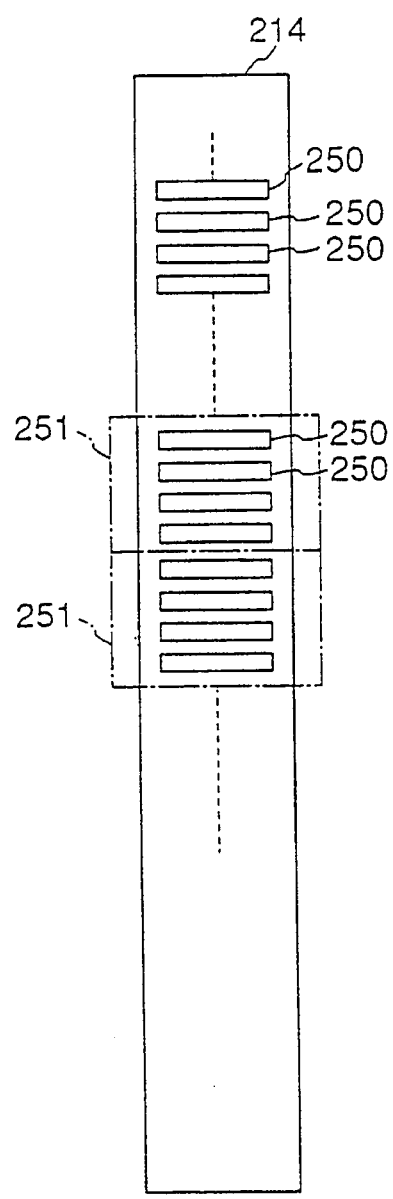
FIGS. 1A, 1B and 1C respectively are diagrams for explaining the formation of a capsule from objects.
Figure 1B:
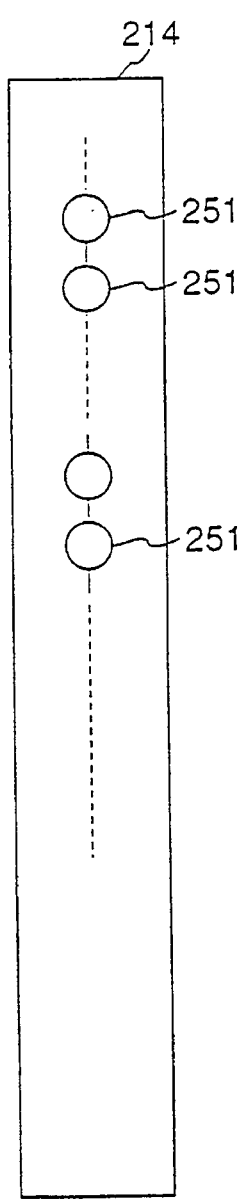
Figure 1C:
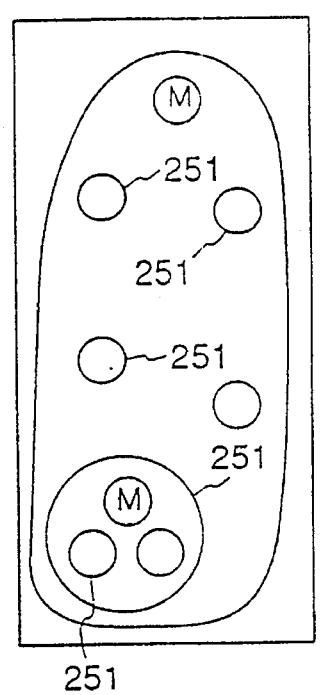
Figure 2:
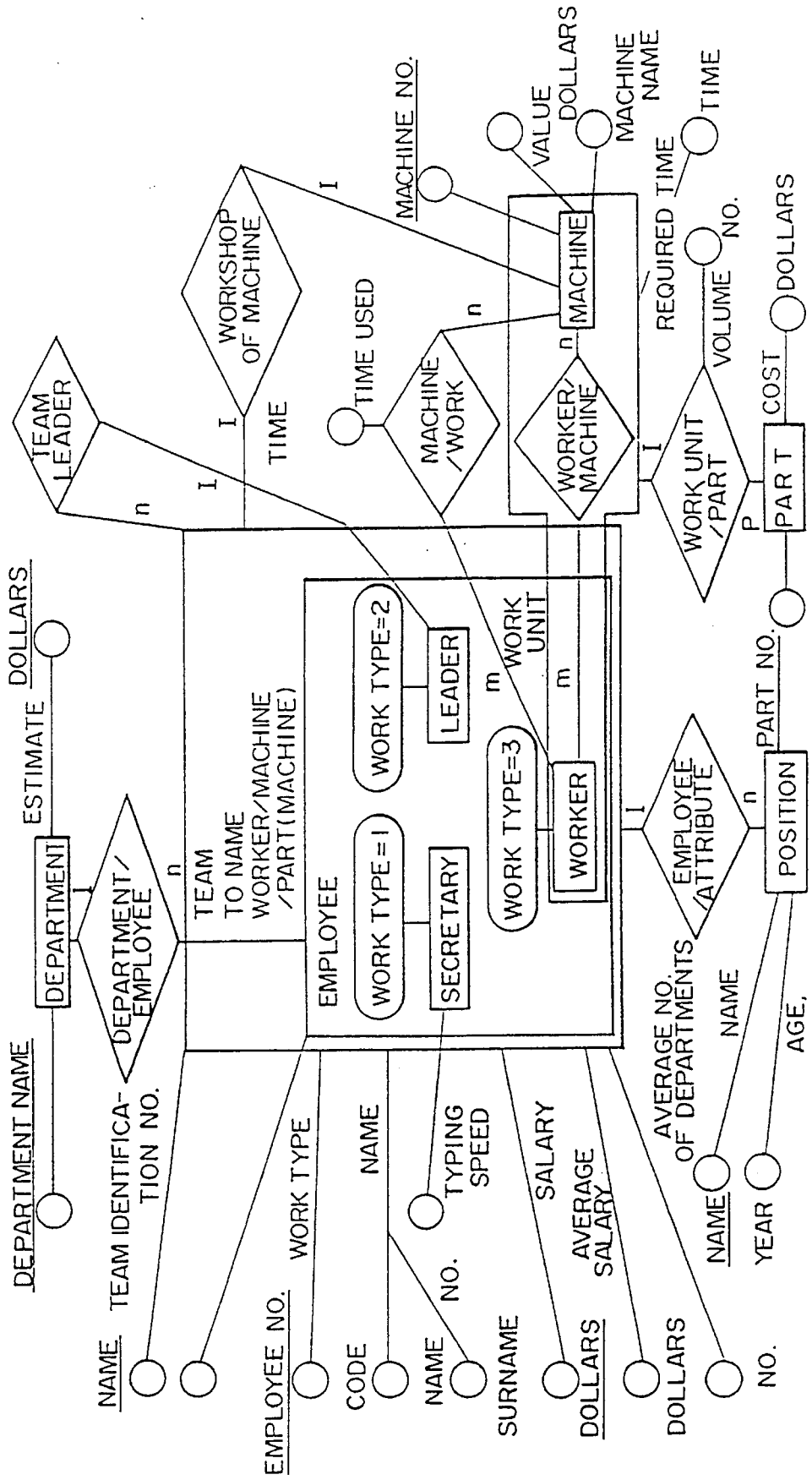
FIG. 2 is a diagram for explaining model forming for departments of a company.
Figure 3:
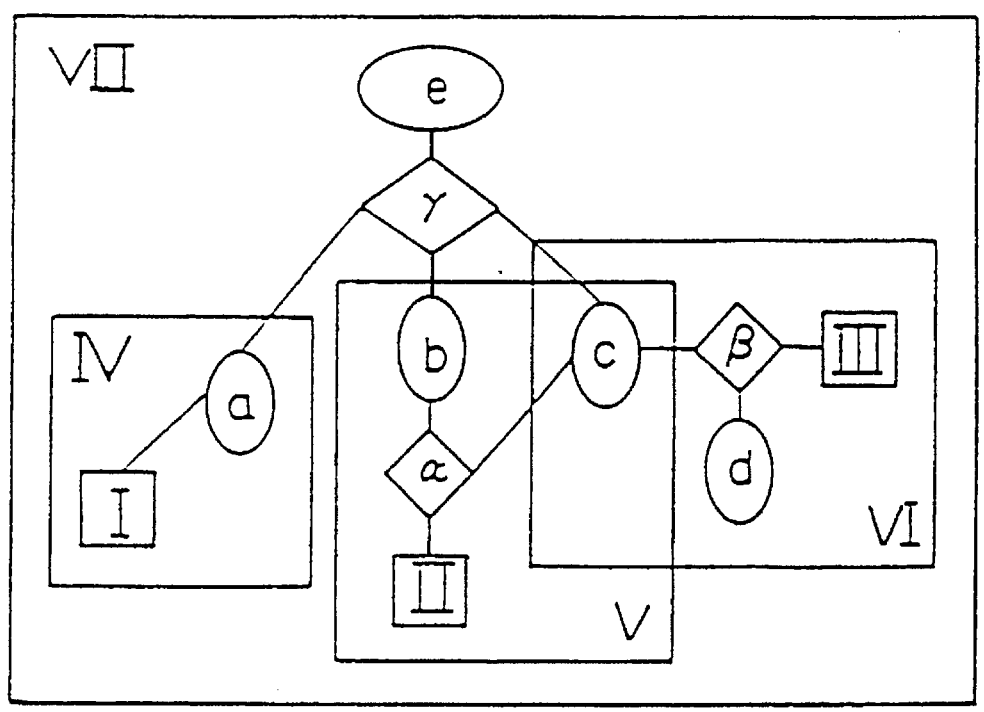
FIG. 3 is a diagram showing a model in an abstract form.

As described above with reference to FIGS. 1A through 1C, the objects are generally combined into target processing units in the form of the composite object, and becomes a unit for exhibiting a behavior for executing a process having a certain object. Such composite objects are stored in the parts attribute file 205 in the form of object parts 206 which are specified by the object commands 201.

When generating a system corresponding to the new process request, that is, a new processing function, a new object is generated or the existing objects are linked depending on the target, and the object which exhibits the new processing function is prepared as one of the object parts 206, in order to enable the new processing function corresponding to the new process request.

A simulation is carried out with respect to the generated object so as to determine whether or not a correct function is actually obtained, or a provisional operation is carried out with respect to the generated objects for which the simulation is ended. Such a process corresponds to the provisional operation mode 216 shown in FIG. 9. The dynamic object process part 212 uses the content of the parts attribute file 205 to simulate the corresponding processing operation.

Figure 10:
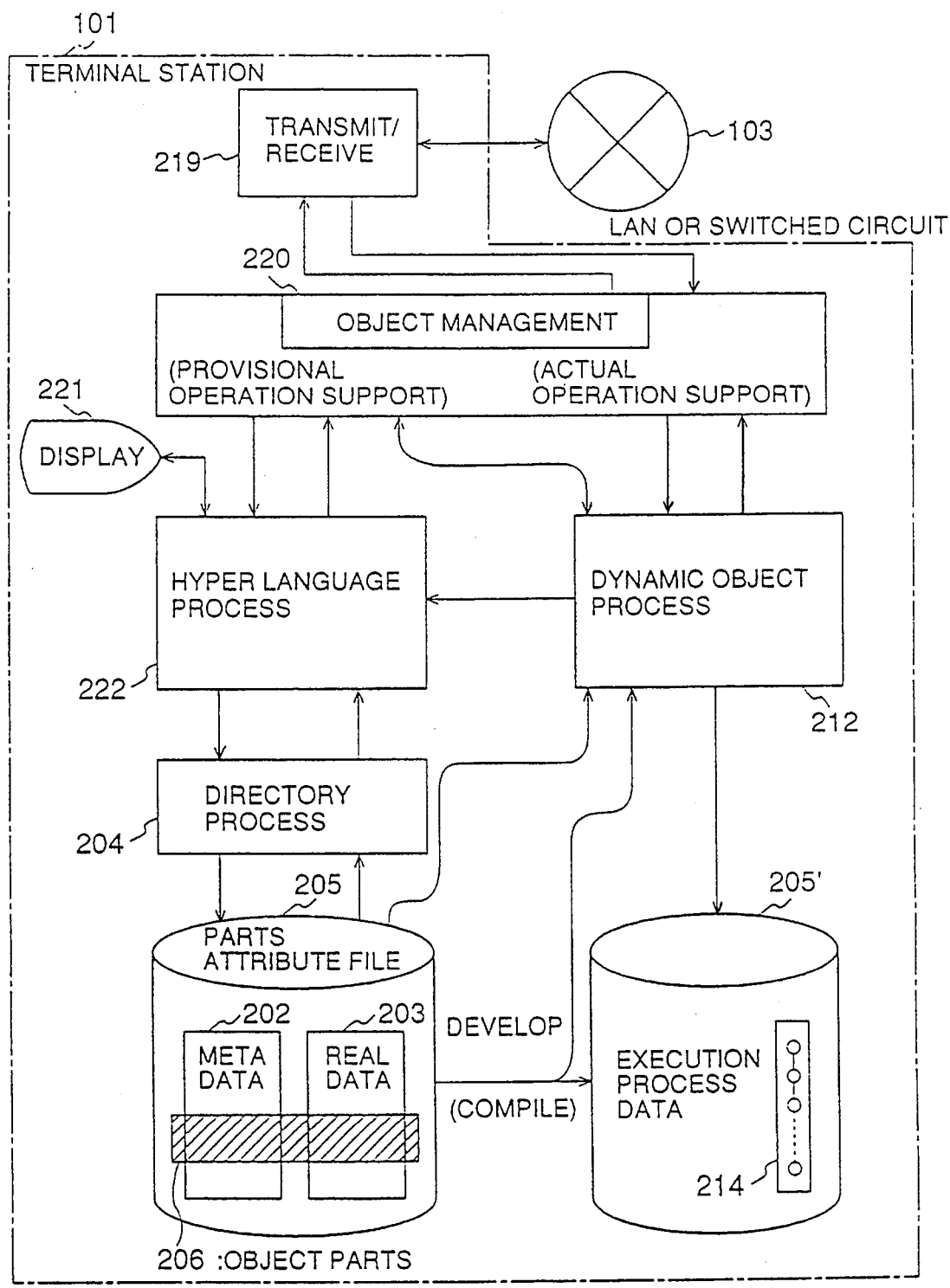
FIG. 10 is a system block diagram showing the construction of a terminal station.

The object 213 or the object group which operates normally in the provisional operation mode 216 is developed into the execution process data 214, that is, compiled into one execution process data 214, because the object 213 or the object group as it is requires a large number of communications with the object management part 220 shown in FIG. 10 and the processing speed is slow. This developing process is carried out in the direct object process developing process 215 and is stored in the parts attribute file 205'.

The dynamic object process part 212 uses the content of the parts attribute file 205 and temporarily carries out a substitute process with respect to a predetermined process. On the other hand, if it becomes necessary to carry out a test process, the dynamic object process part 212 activates the direct object process developing process 215 to generate the execution process data 214 and carries out this process. In FIG. 9, such a process mode is indicated as the instant operation mode 217.

The actual operation mode 218 shown in FIG. 9 is a mode for actually carrying out the process using the execution process data 214 shown.

The semantic (meaning or significance) data related to the nature of the object is described in the meta data within the parts attribute file 205. In addition, it may be regarded that the link relationship of a certain object with respect to the object in the upper layer (object indicated by the "is-a" relationship), the link relationship of the certain object with respect to the object group in the lower layer and included in the certain object (group of objects indicated by the "part-of" relationship) and the like are also described in the meta data within the parts attribute file 205. The layer indicates the layer of a hierarchy relationship. In addition, the link relationship includes the strong link 500 and the weak link 501 described above.

FIG. 10 shows the construction of a terminal station. In FIG. 10, those parts which are the same as those corresponding parts in FIG. 9 are designated by the same reference numerals. A terminal station 101 shown in FIG. 10 executes the process using the execution process data 214, and communicates with another terminal station via a line 103. The line 103 is a line of a local area network (LAN), a switched circuit or the like.

A communication/reception process part 219, the object management part 220, a display 221, a hyper language process part 222 and the like exist within the terminal station 101.

A directory process part 204 shown in FIG. 10 can also be referred to as a command link process part or a directory process part. When one new object is formed, a command (object command) corresponding to the name of this new object is set, storage locations of real data 203 and meta data 202 are assigned, and a command link table is formed. In doing so, the type of the object is determined, and the size is determined. Using the command link table, it is possible to input and output the combination of the meta data 202 and the real data 203.

In FIG. 10, a "provisional operation support" is a support function corresponding to the operation that is carried out until the provisional operation mode 216 shown in FIG. 9 is carried out.

The hyper language process part 222 shown in FIG. 10 has a "parts display/selection" function, and retrieves the usable object parts from the display 221 and outputs the same. If no appropriate object part exists, the hyper language process part 222 uses a "parts specify" function to specify a part as a new object part. The hyper language process part 222 can also generate a class object part by a "attribute set" function, and generate an instance object part by a "schema" function.

The "parts display" function using the display 221 includes (i) content display of names and comments of meta data of the object parts, (ii) display of schema and attribute indicating the content of the object parts, and (iii) display of class attributes and instance constants.

A "parts combine" function of the hyper language process part 222 combines the object parts to obtain a larger composite object part. For this "parts combine" function, there are provided a function of adding, modifying and deleting the attribute related to the formation of the classes, and a function of adding, modifying and deleting the schema related to the formation of the instance constants.

A "user screen form" function of the hyper language process part 222 forms the instance by inputting the screen data in the buffer of the "screen form and display" class when making the screen forming and display. For this reason, the "user screen form" function corresponds to forming the screen class into the form of the instance.

Figure 4A:
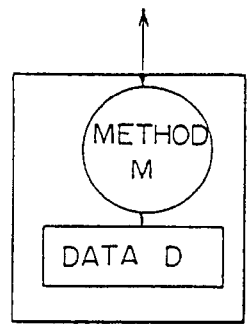
FIGS. 4A, 4B and 4C respectively are diagrams for explaining the capsule.
Figure 4B:
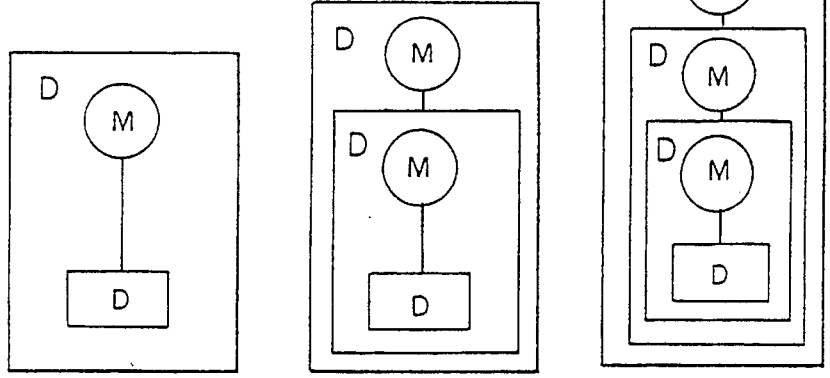
Figure 4C:
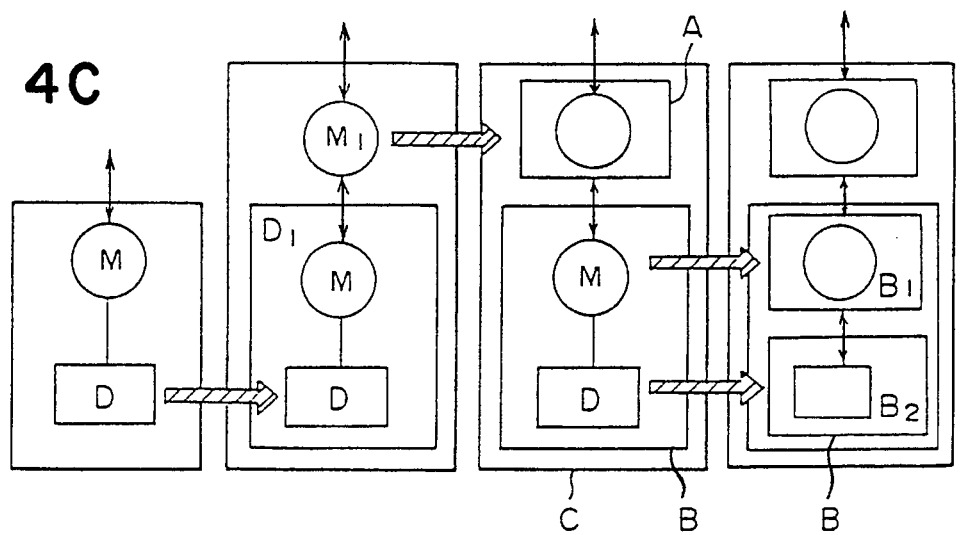

A "provisional operation" function of the hyper language process part 222 links the message to the method indicated by the class when the instance receives the message. Hence, the capsule shown in FIG. 4C is temporarily realized in a primary memory, and the behavior of the capsule is executed.

Furthermore, a "parts modify" function of the hyper language process part 222 is a function of modifying the object parts by modifying, adding and deleting the attribute and schema. In addition, a "parts register" function is a function of registering the object parts in the parts attribute file 205 by making the object parts correspond to the object commands which are the names of the object parts.

The "develop (compile)" shown in FIG. 10 indicates the direct object process developing process 215 shown in FIG. 9. The developing process makes a developing into a largest possible execution process data 214 depending on the side of the primary memory of the data processing system.

The object management part 220 controls the hyper language process part 222 shown in FIG. 10 to hold the object parts 206 in the parts attribute file 205, and controls the dynamic object process part 212 to carry out the provisional operation mode 216, the instant operation mode 217 and the actual operation mode 218. In addition, the instance is activated in the provisional operation mode 216 in correspondence with the message reception via the line 103, and a capsule is provisionally formed in the primary memory to operate the data processing system and to make a message transmission related to the result of the processing.

When carrying out the process within the terminal station 101, if the desired object part does not exist within the terminal station 101 or the attribute or schema does not exist, a data transfer is received from another terminal station via the line 103 to introduce the data within the terminal station 101 and carry out a learning process.

Figure 11:
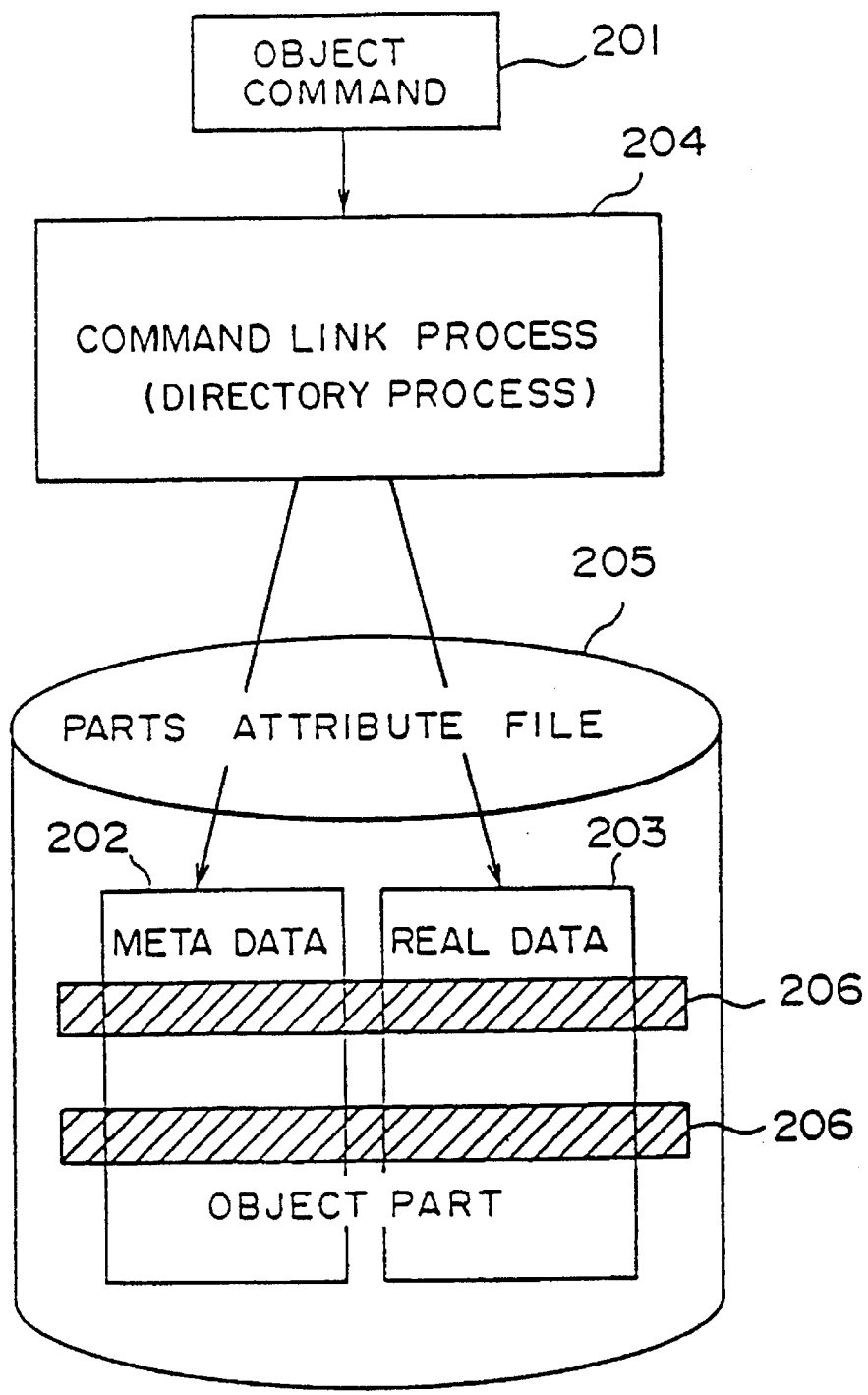
FIG. 11 is a diagram for explaining a process of treating the object.

FIG. 11 is a diagram for explaining the processing of treating the object.

The object parts 206 of the parts attribute file 205 shown in FIG. 11 may be regarded as being obtained by combining into one the user data within the conventional user data database and the meta data within the conventional meta data database. Of course, conventionally, the database management system for managing the user data database and the data dictionary and directory system for managing the meta data database operated independently of each other. In addition, accesses were made to the contents of the user data database and the contents of the meta data database independently of each other and used.

On the other hand, in FIG. 11, the real data 203 and the meta data 202 are combined, and is treated as one object part 206 by specifying it by the object command.

It is conceivable to combine the individual user data (entity data) of the user data database and the individual meta data of the meta data database, and treat the combinations as the object parts.

The targets to the treated as the object parts include primitive objects which are objects of the minimum scale, capsule objects which are successively combined, event objects, system objects and the like. For this reason, the targets to be treated are extremely complex and combined in a complicated manner. As a result, when one object is given, it may turn out that only the person who directly created the object can determine the nature or character of the object.

In view of the above, out of the meta data and the entity data forming the object parts, information such as descriptions on the entity data such as names and comments, semantic data model that gives a meaning to a third person, a general flow, a detailed flow, a source program is written in the meta data.

Accordingly, the object part in general has a sufficiently large amount of information, and it is desirable to give to the object part a name which simply describes the contents of the object part.

In the present invention, the names given to the objects describe the contents of the object parts related to the objects which may be combined, so that it is possible to make access to the object parts by the names.

Figure 12:
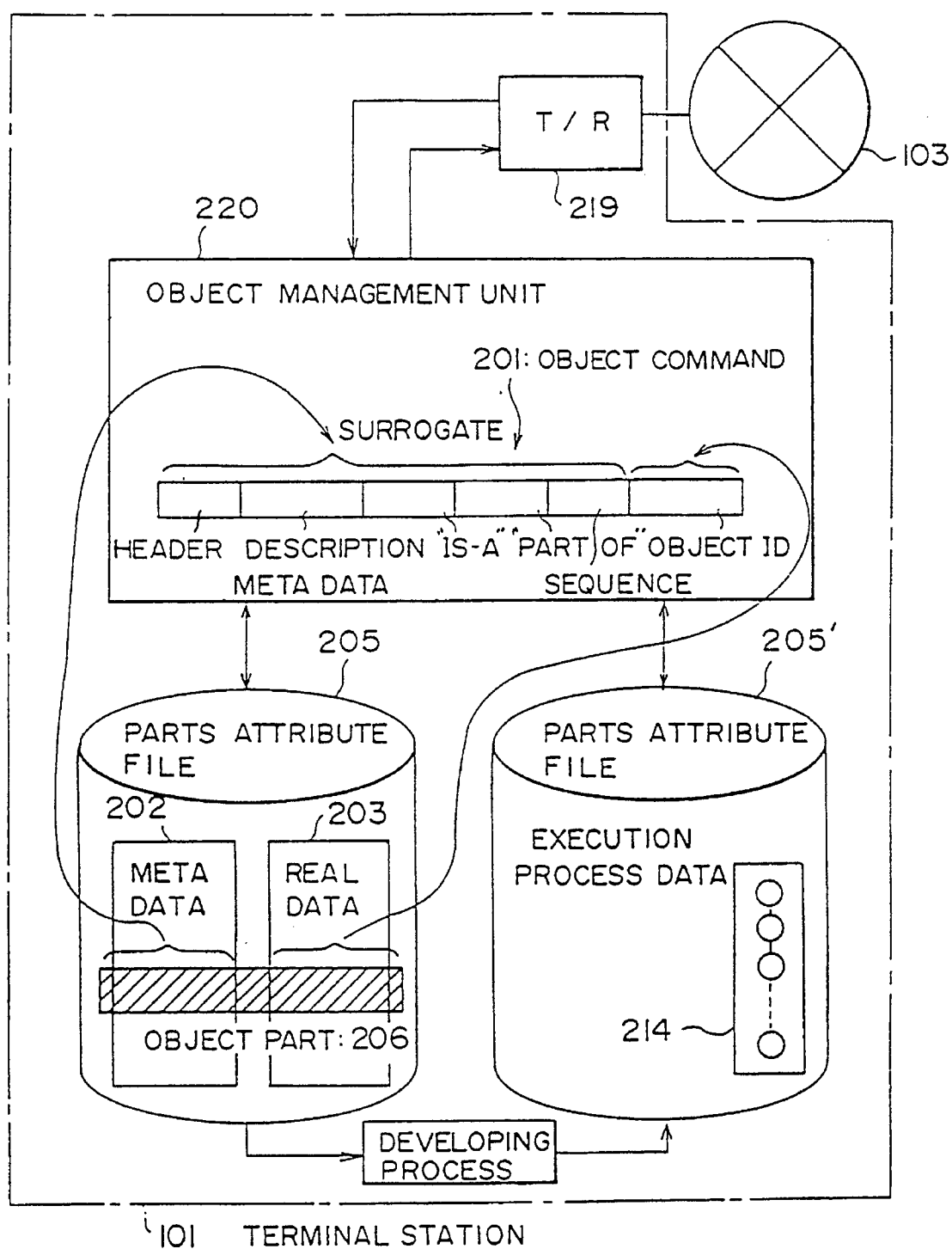
FIG. 12 is a diagram for explaining an object management.

FIG. 12 shows the construction of the terminal station 101 for carrying out the object management. The terminal station 101 forms the data processing system. The communication between the terminal station 101 and another terminal station (not shown) is made via the local area network (LAN) or switched circuit 103.

The terminal station 101 generally includes parts attribute files 205 and 205', a transmitter/receiver 219, and an object management unit 220. The parts attribute file 205 includes meta data 202, real data 203, and object parts 206. The parts attribute file 205' is the same as the parts attribute file 205 and includes an execution process data 214. The execution process data 214 is obtained by compiling one or a combination of the object parts and developing the compiled result in a form suited for the actual execution process.

The object command 201 in the object management unit 220 is given as a name for specifying the object part 206. The object command 201 is generally divided into a surrogate (or signature) and an object ID. The surrogate is made up of parts (i) through (vi) described hereunder.

(i) Header: The header specifies the byte from which predetermined information starts and the number of bytes in which the predetermined information exists. The predetermined information includes a descriptive region which will be described later, an "is-a" hierarchy, a "part-of" hierarchy, a sequence and the like.

(ii) Descriptive region: The descriptive region is a summary of the description related to the object, and the meta data in its original sense with respect to the object is written in a compressed form. For example, a part corresponding to the description such as "who made" and "which version" is compressed and written with respect to the object.

(iii) "Is-a" hierarchy: In the case of a description "a dog is an animal", a hierarchical relationship is used by positioning "dog" in a lower hierarchy as opposed to "animal" in a higher hierarchy, so as to describe the relative position of the dog. In other words, in the "is-a" hierarchy, "dog" and the like of the lower hierarchy exist with respect to "animal" in the higher hierarchy.

(iv) "Part-of" hierarchy: For example, "Illinois", "Texas" and "California" form a part of "U.S.A.". A relationship between "Illinois", for example, which forms a part of "U.S.A.", and "U.S.A." is described as a "part-of" hierarchy.

(v) Sequence: A composite object is a complex combination of smaller objects. The sequence describes in a compressed form a part which specifies the execution sequence (including branching) of the group of smaller objects.

(vi) Object ID: The same ID which is conventionally added to the data stored in the user data database is used as the object ID.

The object management unit 220 has functions such as generating a new object part 206 within the parts attribute file 205, correcting and deleting existing object parts, integrating a plurality of object parts into a single object part, and dividing a single object part into a plurality of object parts. In addition, the object management unit 220 also has a function of communicating with a plurality of objects and carrying out a process which is appropriate for the desired processing target by assigning a processing sequence to the individual objects, that is, by ordering the individual objects.

When carrying out the various kinds of processes described above, the object management unit 220 specifies the individual object parts by the object command 201.

The compiling is made if necessary with respect to the group of object parts which are ordered in the above described manner or with respect to the individual object parts, so as to generate the execution process data 214. The execution process data 214 is used when carrying out a data processing within the terminal station 101 or making a communication with another terminal station via the LAN or switched circuit 103. Since the object parts are compiled, the file access is minimized and the data processing or the like can be carried out at a high speed.

Figure 13A:
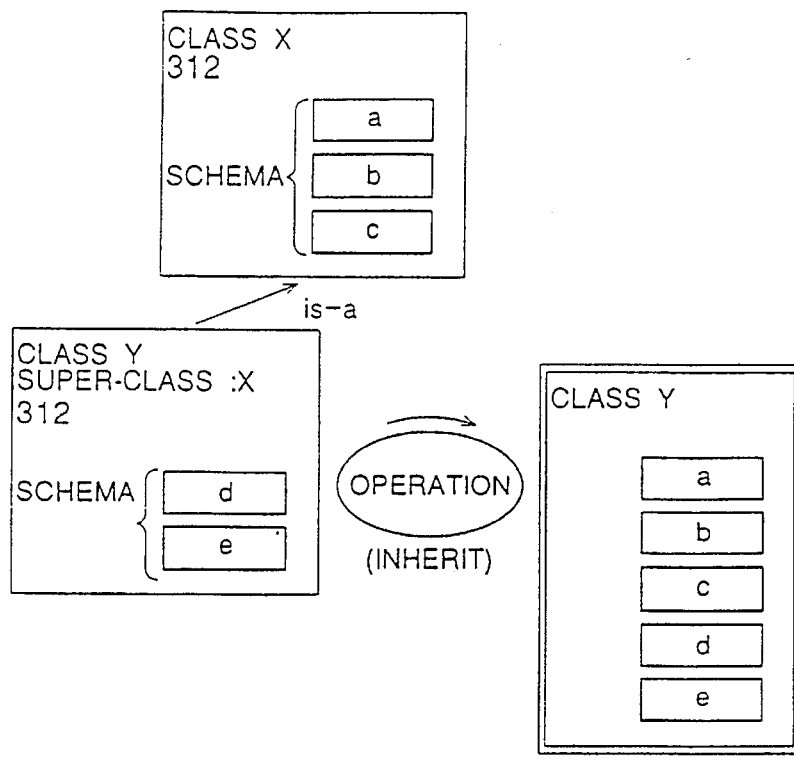
FIGS. 13A and 13B respectively are diagrams for explaining the relationship among a plurality of classes.
Figure 13B:
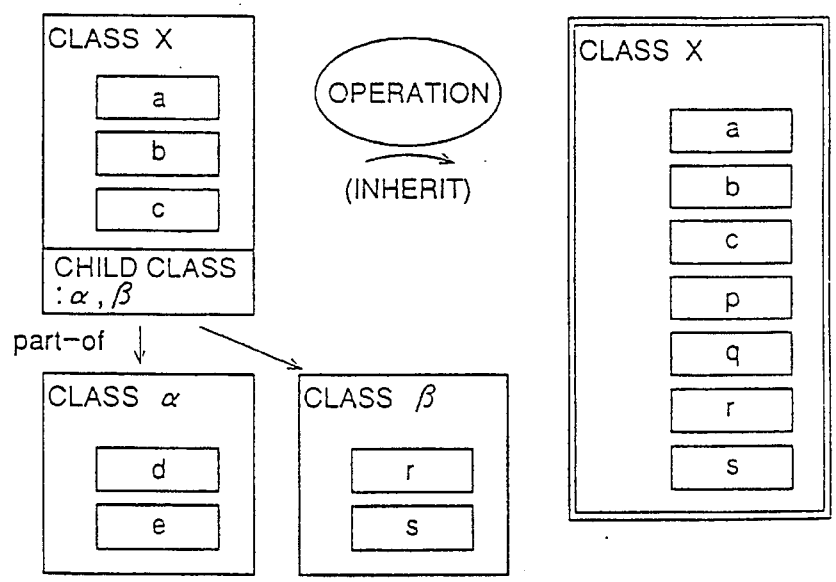

FIGS. 13A and 13B are diagrams for explaining the relationships among a plurality of classes.

FIG. 13A shows a case where a class Y has the "is-a" relationship to a class X. For example, the class X is a program related to "vehicle", and the class Y is a program related to "automobile".

In the case shown in FIG. 13A, methods a, b and c are introduced in relation to the class X, and methods d and e are introduced in relation to the class Y. In such a case, when an instruction specifies execution of the class Y, the methods a, b and c are inherited from the class X when executing the class Y, thereby executing a process based on the methods a, b, c, d and e.

FIG. 13B shows a case where classes α and β have the "part-of" relationship with respect to the class X. For example, the class X is a program related to "vehicle", and the classes α and β respectively are programs related to one of "chassis", "engine", "wheel" and the like.

In the case shown in FIG. 13B, methods a, b and c are introduced in relation to the class X, methods p and q are introduced in relation to the class α, and methods r and s are introduced in relation to the class β. In such a case, when an instruction specifies execution of the class X, a process is executed based on the methods a, b, c, p, q, r and s when executing the class X.

Although the "is-a" relationship and the "part-of" relationship are shown as examples of the template, the template is of course not limited to such.

In the present invention, the system corresponding to the new request is understood in the form of classes and instances, so that the processing target can freely be designed and can be easily used by another process at a later date. In doing so, it is necessary to correctly cope with the restrictions of the cause and effect relationships described above in relation to FIG. 6.

Figure 14:
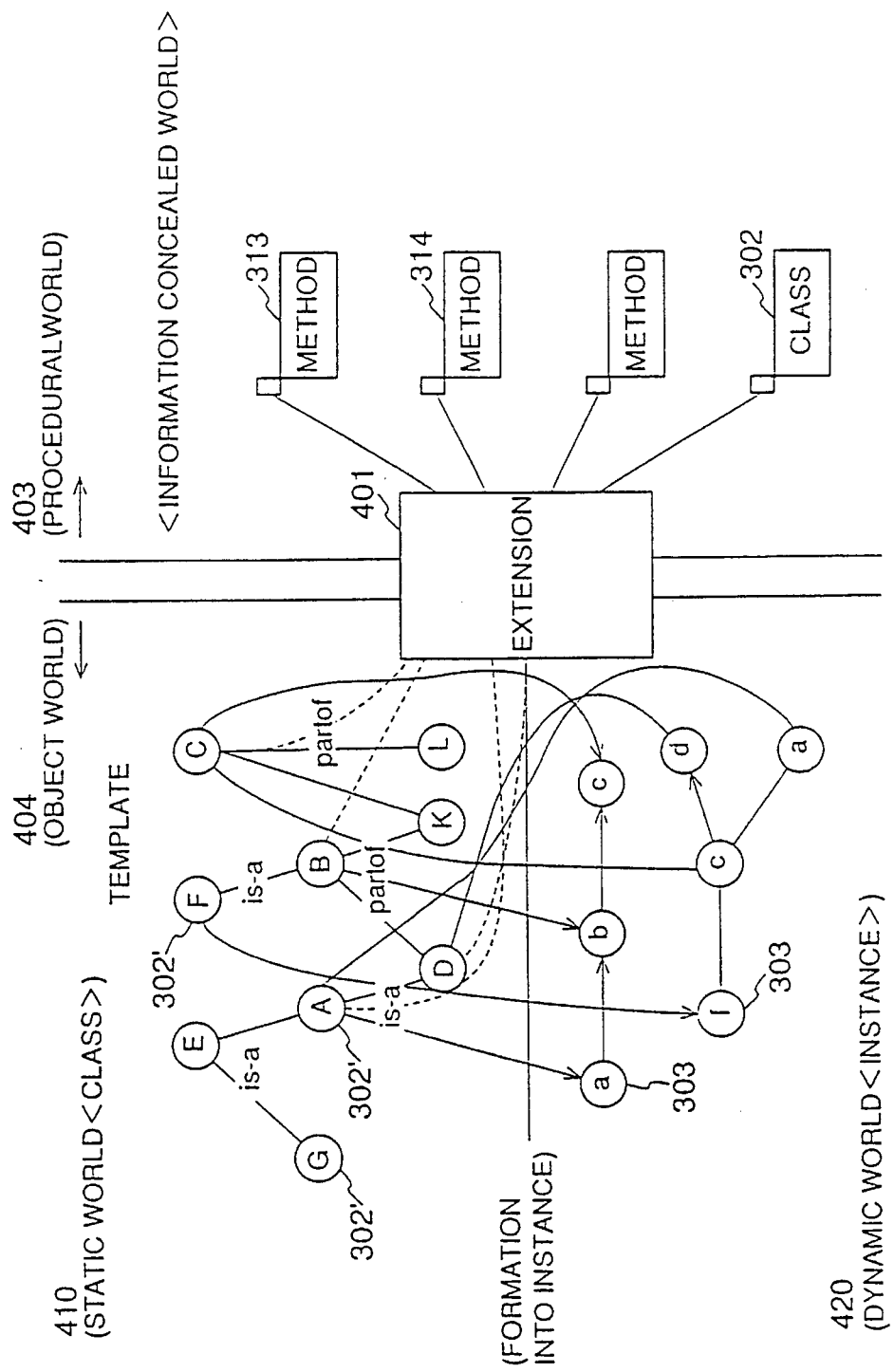
FIG. 14 is a diagram for explaining a process execution.

FIG. 14 is a diagram for explaining the process execution. FIG. 14 shows an extension 401 which corresponds to the extension shown in FIG. 7, a procedural world 403 which corresponds to the connotation shown in FIG. 7, and an object world 404 which represents the model of the real world.

When forming the model of the real world (for example, the requested target system), the present invention uses a static world 410 and a dynamic world 420. The static world 410 specifies the relationship among the classes and/or methods which are required to form the model. On the other hand, the dynamic world 420 specifies the time sequential relationship of the processes of the instances which are obtained when forming the model.

The classes and/or methods specified in the static world 410, and composite classes which are respectively obtained by adding or integrating the classes, are represented hereinafter by classes 302'.

On the other hand, a class 302 exists in the procedural world 403 shown in FIG. 14. Instances 303 exist in the dynamic world 420 shown in FIG. 14, and methods 313, 314, . . . exist in the procedural world 403 shown in FIG. 14.

The methods 313, 314 . . . are existing processing units for respectively executing the individual processes. In order to execute a more complex process, a plurality of methods are introduced from the group of methods to form the class 302. Further, if necessary, a plurality of classes are introduced from the group of classes and a plurality of methods are introduced from the group of methods to form a composite class in order to execute a more complex process. Such classes 302 and the composite classes respectively correspond to one object unit.

It will be assumed for the sake of convenience that such methods and classes already exist.

For example, suppose that a user requests processing of a target process for a certain kind of process. In the present invention, the classes and methods required to process the target process are introduced in order to process the target process, and the mutual relationships among the classes and methods are determined. The static world 410 describes information related to the mutual relationships.

In the case shown in FIG. 14, A, B, C, D, E, F, G, K and L are introduced as the classes 302' for the purpose of processing the target process. (i) The classes G and A respectively have the "is-a" relationship with respect to the class E, (ii) the class D has the "is-a" relationship with respect to the class A, (iii) the class B has the "is-a" relationship with respect to the class F, (iv) the classes D and K respectively have the "part-of" relationship with respect to the class C, and (v) the classes K and L respectively have the "part-of" relationship with respect to the class C. Actually, the class 302' described in the static world 410 is given by use of an identification (ID) or identifier which is sufficient to point the class 302, the method 313 or the like existing in the procedural world 403.

The classes 302' have corresponding relationships to the classes and methods existing in the procedural world 403. In other words, the classes 302' are programs for executing the individual processes and are similar to formulas in mathematics, where it may be regarded that the values within the programs are given by general variables. The instances 303 are obtained by setting the instance data with respect to the general variables of the classes 302' and forming specific programs in which the individual instance data are assembled.

In the dynamic world 420, the processing time sequence of instances a, b, c, . . . corresponding to the classes 302' introduced in the static world 410 are specified, and the process requested by the user is executed.

As described above, if the user requests processing of a certain target process, for example, the classes A, B, C, D, E, F, K and L are specified in the static world 410 as the classes 302' which are required for the processing of the target process. In addition, the relationships such as "is-a" and "part-of" relationships are clarified among the classes 302'. Actually, a state table is prepared and the relationships are described in the state table. If restrictions exist among the classes 302' in respect of the cause and effect relationship, information related to such restrictions are also described in the state table.

When processing the target process requested from the user, the introduced classes 302' are not used as they are. In other words, the instances 303 in which the individual instance data are set, are used with respect to the general variables within each of the classes 302'. In addition, the processing is made according to the time sequential relationship of each of the instances which are processed.

In the case shown in FIG. 14, the instance a corresponding to the class A, the instance b corresponding to the class B, the instance c corresponding to the class C, the instance d corresponding to the class D, and the instance f corresponding to the class F are generated. In addition, there are shown (i) a session in which the instances a, b and c advance in this sequence, and (ii) a session in which the instances f, c, d and a advance in this sequence.

When generating the instance a, the instance a is of course generated using the class A which corresponds to the formula. In this case, since the class A has the "is-a" relationship with respect to the class E, it is regarded that the contents indicated in the class E are inherited to the class A, and the instance a is generated using both the classes E and A.

On the other hand, since the classes D and K respectively have the "part-of" relationship with respect to the class B, the instance b is generated using the classes B, D and K.

When executing each session, the state table described above existing in the static world 410 is inspected and the start of execution of the instance a, for example is written into the state table when starting the execution of the instance a. When the processing of the instance a ends, this end is written into the state table. Hence, the restrictions corresponding to the cause and effect relationship existing in and described in the static world 410 are written into the state table without omission. Of course, new restrictions may be generated, but the new restrictions can be given in correspondence with each of the sessions. For example, such new restrictions may be generated in respect of the cause and effect relationship caused by the assembling of the session under the state where the individual instances a, b, c, . . . are generated. However, the cause and effect relationship generated when the classes 302' are introduced and related in the static world 410 are described in the static world 410, and is inherited to the processing of the session in the dynamic world 420.

Figure 15:
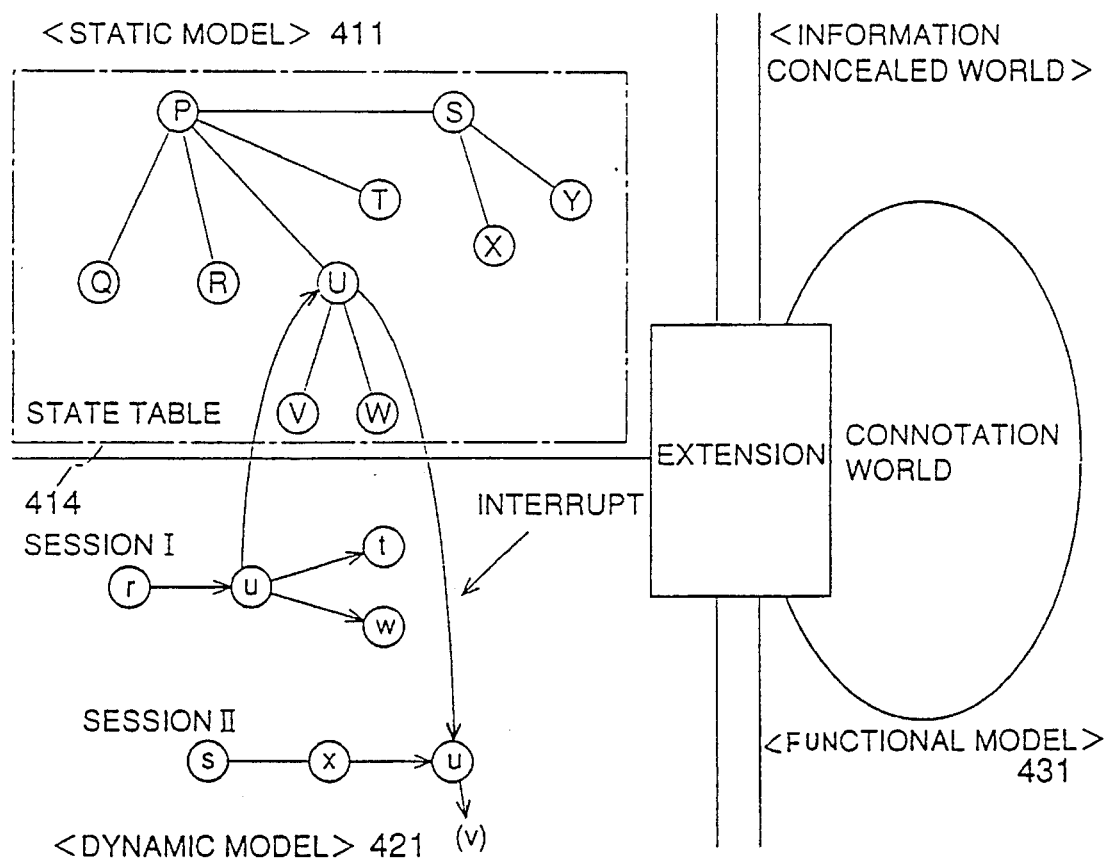
FIG. 15 is a diagram for explaining a state table and the introduction of the cause and effect relationship when executing a session.

FIG. 15 is a diagram for explaining the introduction of the cause and effect relationship when executing a session. In FIG. 15, elements 411, 421 and 431 respectively correspond to the same reference numerals in FIG. 8. In addition, an element 414 in FIG. 15 indicates the same state table as that shown in FIG. 6.

In the case shown in FIG. 15, it is indicated that classes P through Y are introduced as the information within the state table 414 for a certain process. The classes Q, R, S, T and U exist under the class P, the classes X and Y exist under the class S, and the classes V and W exist under the class U. In addition, instances r, u, t, w, s and x are generated and the session is assembled.

A session I and a session II are executed under the dynamic model 421. However, during the time when the individual instances such as the instance u carries out its own process, it is not necessary to take into consideration the cause and effect relationships with the other instances. For example, the content of the state table 414 is inspected at the time when the instance u starts its own process, and the process is executed after checking whether or not no violation is made with respect to the restrictions of the cause and effect relationship. It is sufficient to report the cause and effect relationship to the state table 414 at the time when the process of the instance u is ended.

In a case where, as a result of executing the instance u in the session I, it becomes necessary to execute another instance v instead of executing the instance u in the session II, a branch is made to the instance v by making an interrupt to the instance u of the session II based on the execution end report of the instance u of the session I. Alternatively, the dynamic model 421 is notified of the above when starting the instance u of the session II.

As described above, four hierarchical layers of the classes 302, the composite classes 302-1, the instances 303 and the composite instances (sessions) 304 exist in the present invention. The ennoversion management is carried out with respect to each of these four hierarchical layers so as to prepare for the future reuse of the classes, composite classes, instances and composite instances (sessions) by obtaining the classes, composite classes, instances and composite instances (sessions) in more preferable forms.

Figure 16:
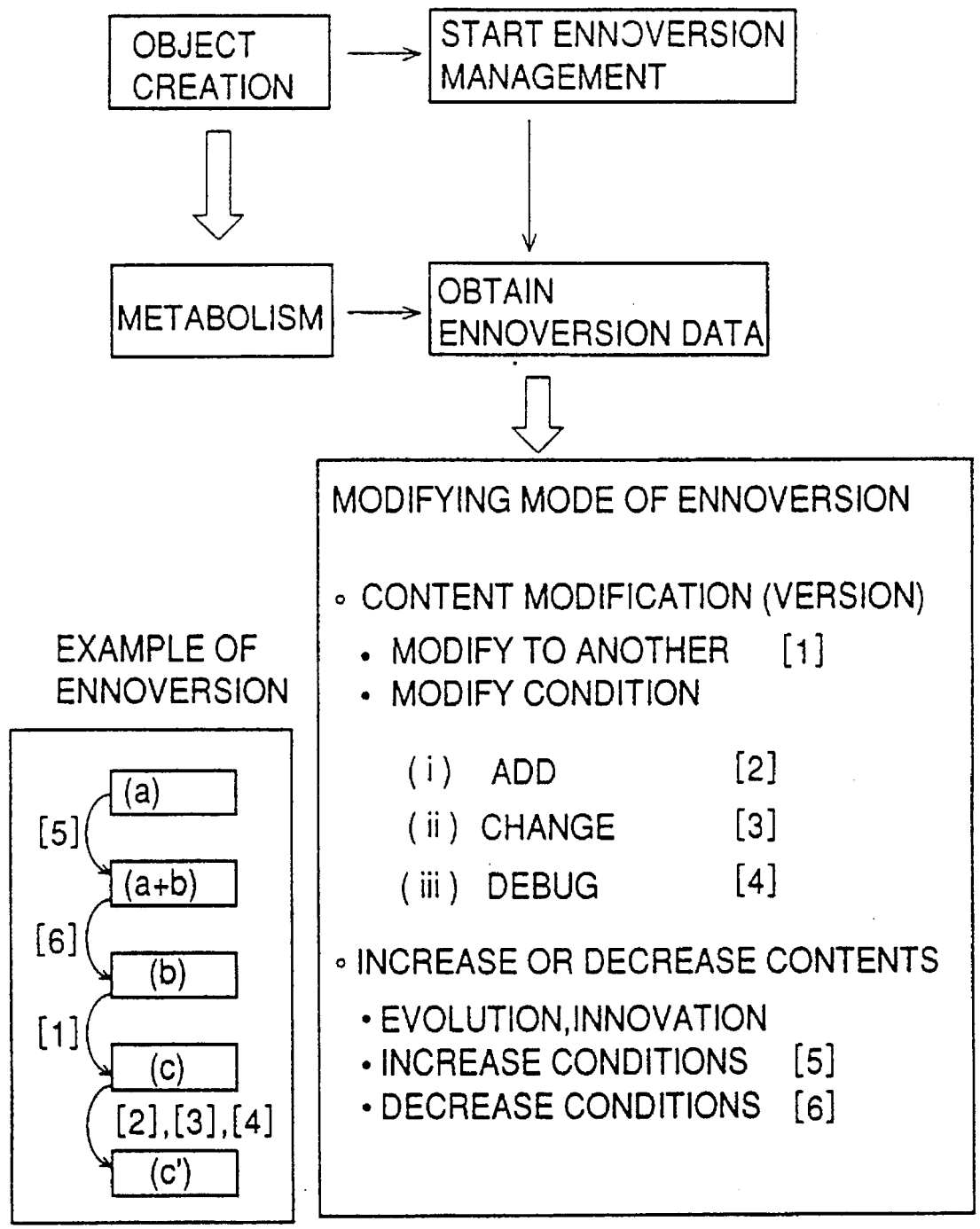
FIG. 16 is a diagram for explaining an ennoversion management.

FIG. 16 is a diagram for explaining the ennoversion management. When the object is generated (or created), the ennoversion management of the present invention is started in correspondence with this generation (creation) of the object. Basically, the ennoversion management is carried out in correspondence with all of the objects. However, at the request of the operator, it is possible not to carry out the ennoversion management for an object.

On the other hand, when metabolism (evolution and degeneration) occurs in relation to the created object, the ennoversion is made in correspondence with this metabolism.

The ennoversion management stores data related to the metabolism (evolution and degeneration). Depending on the mode of the metabolism, either (i) version management or (ii) evolution or innovation management is made. According to the version management, elements of the past may be deleted in principle, and storage of the elements is arbitrary. On the other hand, according to the evolution or innovation management, it is necessary to store the elements because the partial modification is made to match or suit the user's request and the modification is not made because of an inconvenience in the past object.

In FIG. 16, six modifying modes [1] through [6] of the ennoversion are shown.

The mode [1] indicates that the version management has been carried out and that the modification has been made. The mode [2] indicates that the version management has been made and that a condition has been added. The mode [3] indicates that the version management has been carried out and that the conditions have been changed. The mode [4] indicates that the version management has been made and that a debugging (or bug correction) has been made.

The mode [5] indicates that the evolution or innovation management has been carried out and that the conditions have increased. The mode [6] indicates that the evolution or innovation management has been carried out and that the conditions have decreased.

FIG. 16 shows an example of the ennoversion wherein an object having a content (a) first exists, the content changes to (a+b) by the mode [5], the content then changes to (b) by the mode [6], the content thereafter changes to (c) by the mode [1], and the content finally changes to (c') by the mode [2], [3] or [4].

Figure 17:
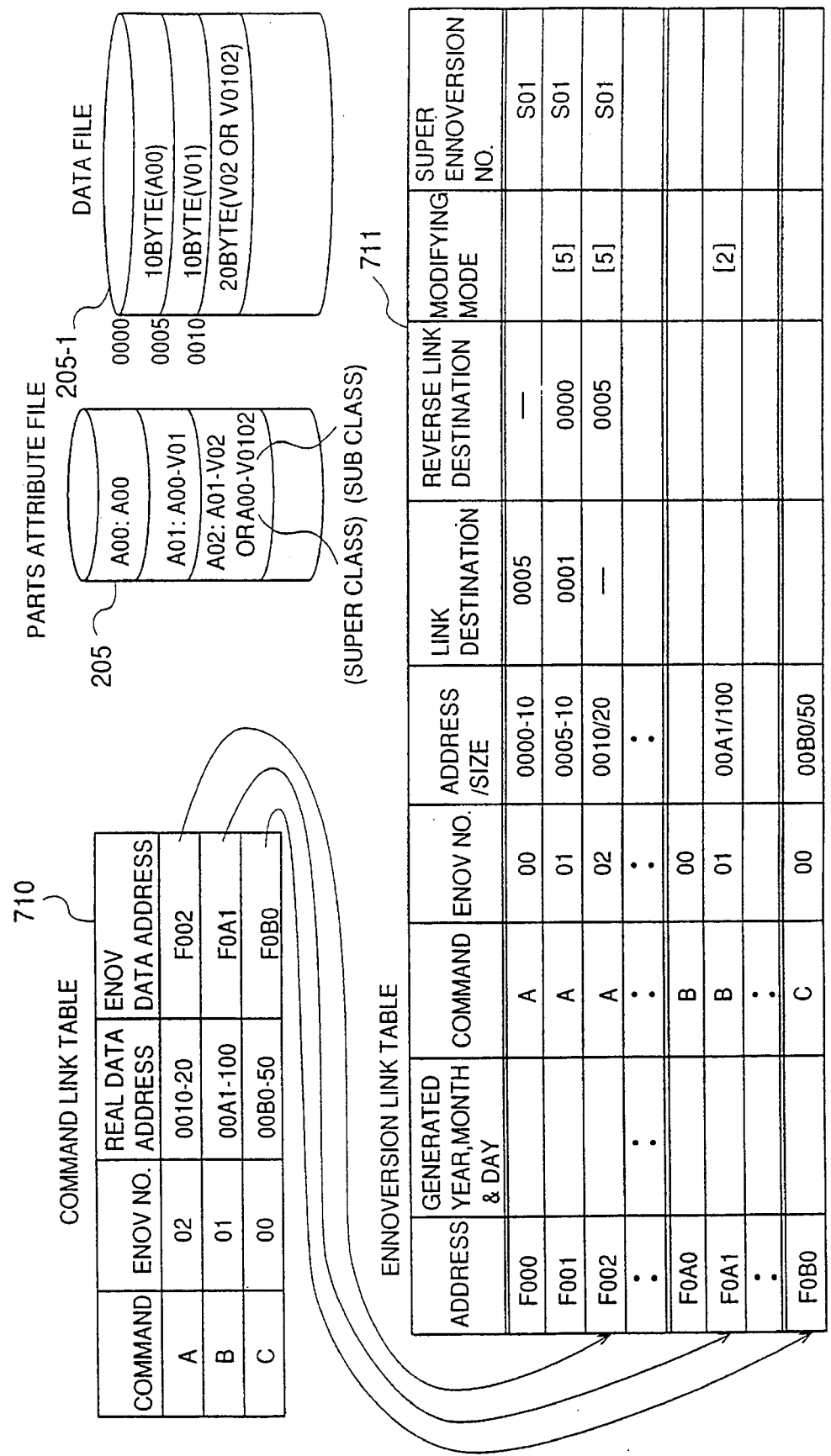
FIG. 17 is a diagram for explaining a command link table and an ennoversion link table.

FIG. 17 is a diagram for explaining a command link table and an ennoversion link table. FIG. 17 shows a command link table 710, an ennoversion link table 711, a parts attribute file 205 shown in FIG. 10, and a data file 205-1.

In FIG. 17, a "command" refers to the object command 201 shown in FIG. 12. In the command link table 710, a most recent description related to the objects obtained as a result of the ennoversion management is written for each of object commands A, B, C, . . . .

An "ENOV number" in the command link table 710 indicates the last ennoversion number for which the ennoversion was carried out. For example, the ENOV number "02" in FIG. 17 indicates that the ennoversion number is presently "02" with respect to the object command A (what is specified by the command for the object A) after being "00" and "01".

A "read data address" in the command link table 710 indicates for example that the real data related to the object command A exists for 20 bytes from an address "0010" in the data file 205-1. In addition, an "ENOV data address" indicates for example an address "F002" where information exists in the ennoversion link table 711 with respect to the object command A.

Information related to the ennoversion number "02" related to the object command A exists in the ennoversion link table 711. In this ennoversion link table 711, a "date and year of generation" indicates the date and year when the object is generated, a "command" indicates the object command, the "ENOV number" indicates the ennoversion number, an "address/size" indicates the position and size of information existing in the data file 205-1, a "link destination" indicates the destination of the link for tracing the ennoversion number related to the object command A, for example, a "reverse link destination" indicates the destination of the link for tracing the ennoversion number related to the object command A in reverse, for example, a "modifying mode" indicates the form of the mode described with reference to FIG. 16, and a "super ennoversion no." indicates the super ennoversion number.

The information having the ennoversion number "00", the ennoversion number "01" and the ennoversion number "02" is specified in the parts attribute file 205 in the form of superclasses and subclasses specifying the stored state in the data file 205-1. In other words, the hierarchical relationship is specified such that, with regard to the information having the ennoversion number "00" of the object A, A00 is indicated as the highest layer class, with regard to the information having the ennoversion number "01", A00 is a superclass, and a subclass V01 corresponds to the difference between A00 and A01. Accordingly, the particular content of the information having the ennoversion number "01" can be obtained by combining the content of A00 amounting to 10 bytes in the data file 205-1 and the content of V01 amounting to 10 bytes and corresponding to the difference between A00 and A01. With regard to the information having the ennoversion number "02", (a) A01 itself may be specified as the superclass and V02 may be specified as the subclass corresponding to the difference between A01 and A02 or, (b) A00 itself may be specified as the superclass and V0102 may be specified as the subclass corresponding to the difference between A00 and A02. Hence, the particular content of the information having the ennoversion number "02" may be obtained from the data file 205-1, similarly as in the case where the information having the ennoversion number "01" is obtained.

Figure 18:
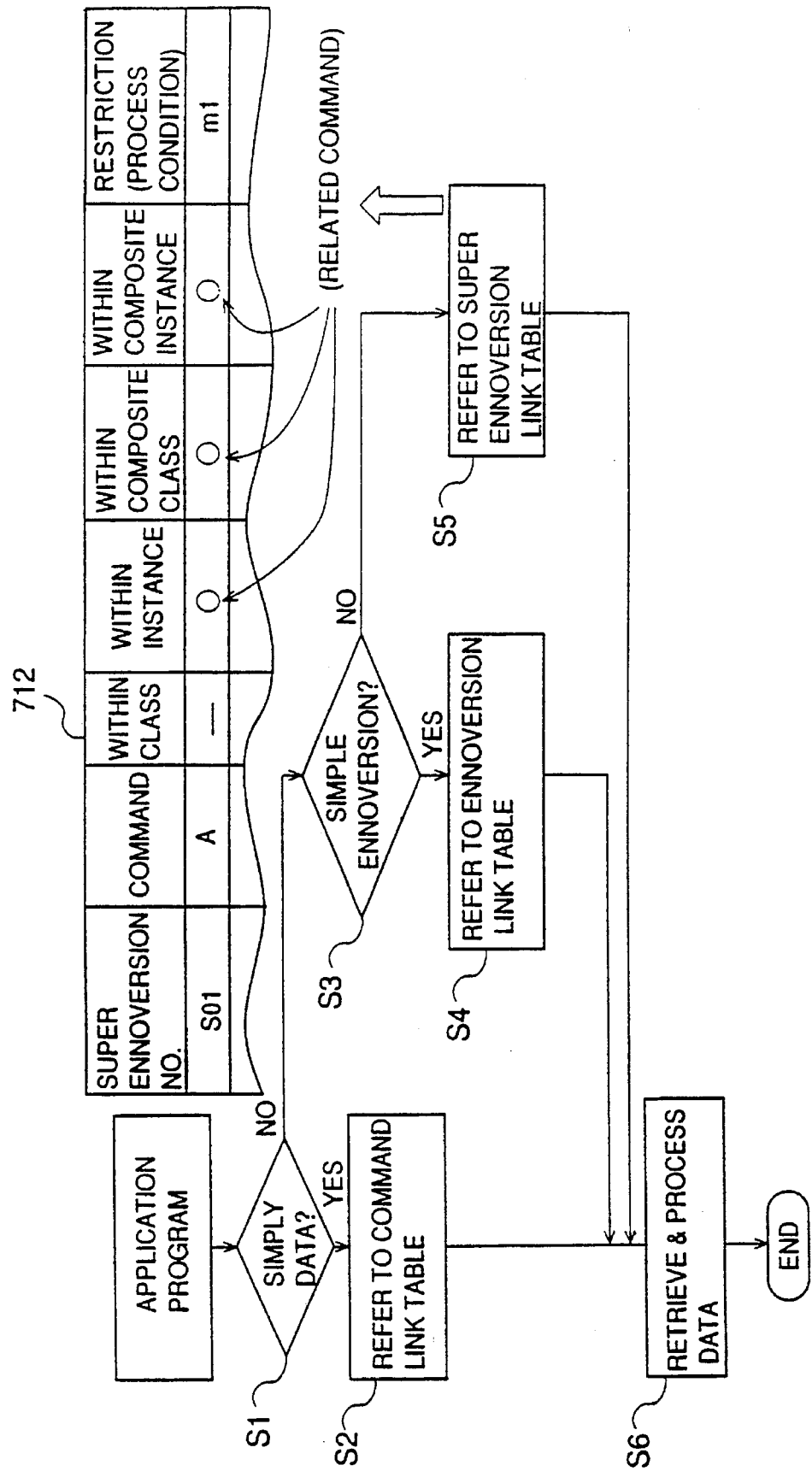
FIG. 18 is a flow chart for explaining a process of deciding whether or not to carry out the ennoversion.

FIG. 18 is a flow chart for explaining a process of deciding whether or not to carry out the ennoversion.

When the application program is started in FIG. 18, a step S1 decides whether or not the information is simply data, and a step S2 makes a reference to the command link table 710 if the decision result in the step S1 is YES. Hence, when simply extracting the data, the command link table 710 is retrieved with respect to the object command A, for example, and no process related to the ennoversion is carried out.

On the other hand, if the decision result in the step S1 is NO, a step S3 decides whether or not the ennoversion is to be carried out simply for one of the four hierarchical layers.

A step S4 retrieves the ennoversion link table 711 if the decision result in the step S3 is YES. On the other hand, a step S5 retrieves a super ennoversion link table 712 shown in FIG. 18. After the step S4 or S5, a step S6 retrieves the necessary data, and the process ends.

As shown in FIG. 18, the super ennoversion link table 712 is written with the super ennoversion number, whether or not the modification related to the object command A (assuming it is a class), for example, should take into consideration the modification of the object within the class, the instance, the composite class and the composite instance, and a restriction (processing condition). A "related command" is written in the corresponding column such as "in-instance" if the modification of the object should be taken into consideration. In this case shown in FIG. 18, a condition $m_1$ is written as the processing condition. It may be regarded that the super ennoversion management part 705 operates when it is necessary to write the "related command" shown in FIG. 18.

Figure 19:
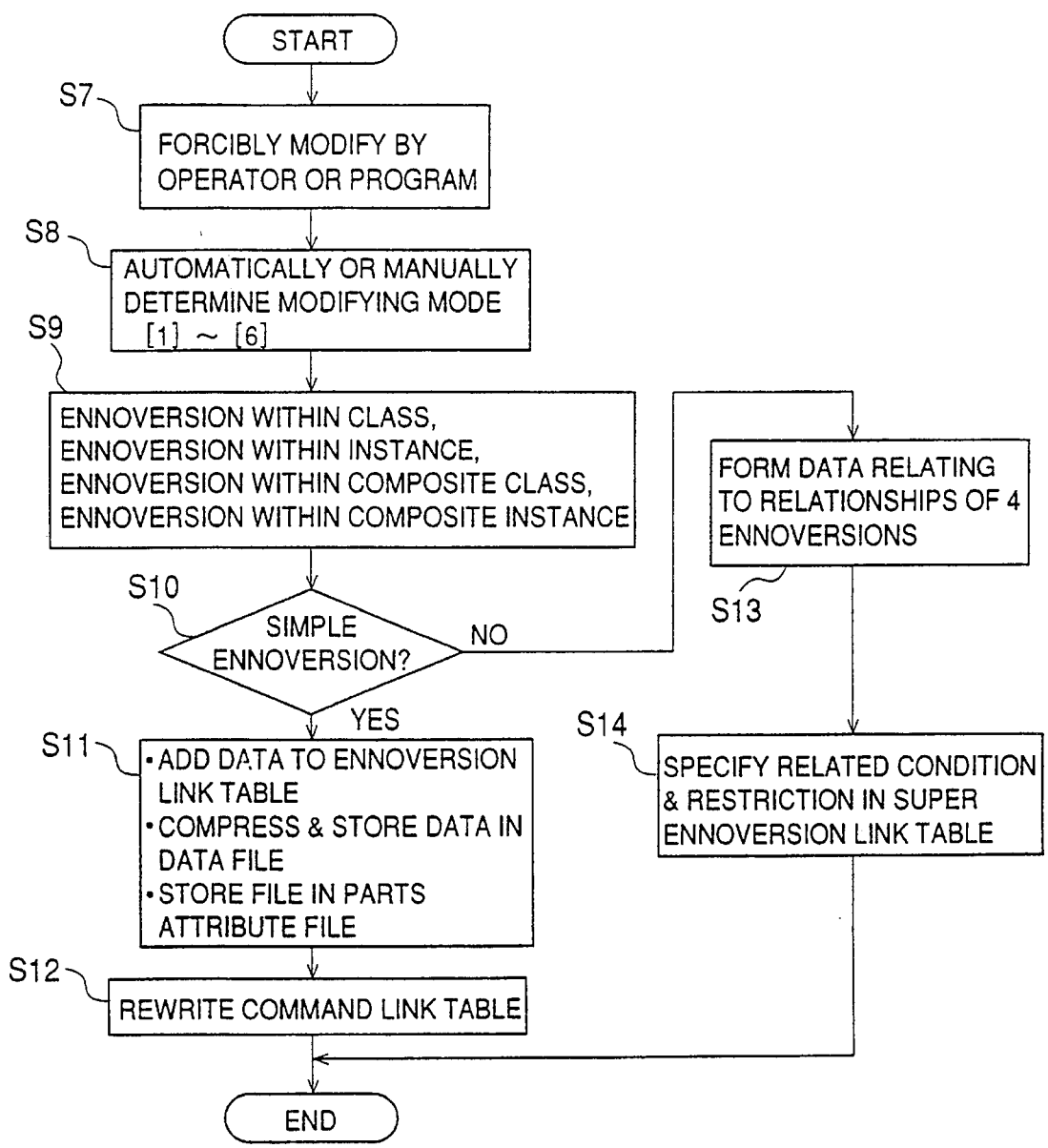
FIG. 19 is a flow chart for explaining the ennoversion process.

FIG. 19 is a flow chart for explaining the ennoversion process.

In FIG. 19, a step S7 forcibly modifies the object in response to an operation made by the operator in response to a program, and a step S8 determines the modifying mode automatically or manually. A step S9 checks whether the ennoversion is within the class, the instance, the composite class or the composite instance. A step S10 decides whether or not only a single ennoversion exists.

If the decision result in the step S10 is YES, a step S11 (i) adds data to the ennoversion link table 710, (ii) compresses the data and stores the compressed data into the data file 205-1, and (iii) stores the data in the parts attribute file 205. A step S12 rewrites the contents of the command link table 710 to the most recent contents, and the process ends.

On the other hand, if the decision result in the step S10 is NO, a step S13 forms data indicating the relationships among the four ennoversions. Then, a step S14 specifies the related condition and the restriction (processing condition) in the super ennoversion link table 712, and the process ends.

Further, the present invention is not limited to these embodiments, but various variations and modifications may be made without departing from the scope of the present invention.

What is claimed:

1. An ennoversion management system adapted to a data processing system which executes a desired process by naming as objects single processing units and/or composite processing units which are combinations of the single processing units and combining the objects, said ennoversion management system comprising:

means for understanding a real world as an object model, for corresponding the real world to an extension representing things of the real world and a connotation providing a meaning of the extension including a procedural world, for placing the connotation in an information concealed region, and for forming identification information which specifies the connotation in correspondence with the extension;

means for describing the real world via a dynamic world including no spatial information and a static world including no time related information and forming a world of the objects in correspondence with the extension;

means for providing as a static model a system mechanism with respect to the static world using classes and/or composite classes, and for providing as a dynamic model a session corresponding to a motion of the dynamic model with respect to the dynamic world using instances of the composite classes and/or the classes;

means for providing cause and effect relationships generated from the dynamic model into the static model as information;

means for forming the classes and/or composite classes by combining a plurality of existing and/or newly generated methods, and for forming the instances in correspondence with the classes and/or the composite classes;

means for storing as a functional model the existing and/or newly generated methods, the formed classes and/or composite classes, and the session corresponding to the motion of the dynamic model in the information concealed region corresponding to the connotation as composite objects;

means for reusably forming in correspondence with the identification information the objects and/or composite objects stored in the connotation as the functional model; and means for carrying out an ennoversion management with respect to the classes, the composite classes, the instances and the sessions and managing a relationship of the static world, the dynamic world, the procedural world, and cause and effect, said ennoversion management including management of version, evolution and innovation.

2. The ennoversion management system as claimed in claim 1, wherein said means for carrying out the ennoversion management uses an ennoversion link table which stores at least a modifying mode of the ennoversion.

3. The ennoversion management system as claimed in claim 2, wherein said modifying mode includes a first mode which indicates that the version management has been carried out and that the modification has been made, a second mode which indicates that the version management has been made and that a condition has been added, a third mode which indicates that the version management has been carried out and that the conditions have been changed, a fourth mode which indicates that the version management has been made and that debugging has been performed, a fifth mode which indicates that the evolution or innovation management has been carried out and that the conditions have increased, and a sixth mode which indicates that the evolution or innovation management has been carried out and that the conditions have decreased.

4. The ennoversion management system as claimed in claim 1, wherein the version management of the ennoversion management is made when a modifying factor including an error exists in an original object, and the evolution or innovation management of the ennoversion management is made when no error exists in the original object but contents of the original object are increased or decreased.

5. The ennoversion management system as claimed in claim 1, which further comprises:

a super ennoversion link table which stores information for a case where a modification to be carried out is related to at least two out of the classes, the composite classes, the instances and the sessions.

* * * * *